(12) United States Patent
Wang et al.

(10) Patent No.: US 9,558,025 B2
(45) Date of Patent: Jan. 31, 2017

(54) INTER-BOARD VIRTUALIZATION MANAGEMENT FOR MANAGING HARDWARE RESOURCES CORRESPONDING TO INTERRUPTS

(71) Applicant: Huawei Technologies Co., Ltd., Shenzhen, Guangdong (CN)

(72) Inventors: Shuai Wang, Shenzhen (CN); Jun Li, Shenzhen (CN); Yuzhang Li, Shenzhen (CN)

(73) Assignee: Huwaei Technologies Co., Ltd., Shenzhen (CN)

( * ) Notice: Subject to any disclaimer, the term of this patent is extended or adjusted under 35 U.S.C. 154(b) by 540 days.

(21) Appl. No.: 14/081,823

(22) Filed: Nov. 15, 2013

(65) Prior Publication Data

US 2014/0075439 A1 Mar. 13, 2014

Related U.S. Application Data

(63) Continuation of application No. PCT/CN2013/070269, filed on Jan. 9, 2013.

(30) Foreign Application Priority Data

Jun. 8, 2012 (CN) .......................... 2012 1 0188613

(51) Int. Cl.
*G06F 9/455* (2006.01)
*G06F 9/46* (2006.01)
*G06F 9/50* (2006.01)

(52) U.S. Cl.
CPC ....... *G06F 9/45541* (2013.01); *G06F 9/45558* (2013.01); *G06F 9/5077* (2013.01); *G06F 9/5088* (2013.01); *G06F 2009/4557* (2013.01)

(58) Field of Classification Search
None
See application file for complete search history.

(56) References Cited

U.S. PATENT DOCUMENTS

| 7,669,202 B1 | 2/2010 | Tene et al. |
| 8,010,679 B2 | 8/2011 | Low et al. |

(Continued)

FOREIGN PATENT DOCUMENTS

| CN | 101135997 A | 3/2008 |
| CN | 101398769 A | 4/2009 |

(Continued)

*Primary Examiner* — Meng An
*Assistant Examiner* — Bradley Teets
(74) *Attorney, Agent, or Firm* — Leydig, Voit & Mayer, Ltd.

(57) ABSTRACT

A virtualization management method and related apparatuses for managing hardware resources of a communication device are disclosed. The method includes: acquiring a first virtual machine context that is issued by a first service board deployed in a communication device and that corresponds to a first interrupt, and issuing the first virtual machine context, or a second virtual machine context that is obtained based on the first virtual machine context and that corresponds to the first interrupt, so that a second service board deployed in the communication device, after acquiring the issued first virtual machine context or second virtual machine context, transfers the acquired first virtual machine context or second virtual machine context to a first virtual machine running on the intra-board Hypervisor in the second service board for processing, where the first virtual machine is the employer of the first hardware resource.

13 Claims, 14 Drawing Sheets

(56) References Cited

U.S. PATENT DOCUMENTS

| | | | |
|---|---|---|---|
| 8,429,276 B1* | 4/2013 | Kumar | G06F 9/5077 709/226 |
| 8,490,090 B2* | 7/2013 | Ben-Yehuda | G06F 9/45558 718/1 |
| 2003/0065835 A1 | 4/2003 | Maergner et al. | |
| 2005/0125580 A1 | 6/2005 | Madukkarumukumana et al. | |
| 2005/0235288 A1 | 10/2005 | Yamakabe et al. | |
| 2006/0123217 A1 | 6/2006 | Burdick et al. | |
| 2007/0050764 A1 | 3/2007 | Traut | |
| 2009/0292897 A1 | 11/2009 | Koinuma | |
| 2009/0327643 A1 | 12/2009 | Goodman et al. | |
| 2010/0115514 A1* | 5/2010 | Maliszewski | G06F 9/45537 718/1 |
| 2010/0138831 A1 | 6/2010 | Inoue et al. | |
| 2010/0185357 A1 | 7/2010 | Mizumachi | |
| 2010/0274940 A1 | 10/2010 | Ahmad et al. | |
| 2011/0072426 A1 | 3/2011 | Huang et al. | |
| 2011/0161957 A1* | 6/2011 | Bernardi | G06F 9/4445 718/1 |
| 2012/0260247 A1* | 10/2012 | Huang | G06F 9/45541 718/1 |
| 2013/0036323 A1* | 2/2013 | Goose | G06F 11/1484 714/4.11 |
| 2013/0232483 A1* | 9/2013 | Chen | G06F 9/455 718/1 |
| 2013/0275638 A1* | 10/2013 | Serebrin | G06F 9/45558 710/267 |
| 2014/0229943 A1* | 8/2014 | Tian | G06F 9/45533 718/1 |

FOREIGN PATENT DOCUMENTS

| | | |
|---|---|---|
| CN | 102750178 A | 10/2012 |
| EP | 1939739 A2 | 7/2008 |
| JP | 2001142854 A | 5/2001 |
| JP | 2005309644 A | 11/2005 |
| JP | 2006164281 A | 6/2006 |
| JP | 2010009567 A | 1/2010 |
| JP | 2010231601 A | 10/2010 |
| RU | 2398267 C2 | 8/2010 |

* cited by examiner

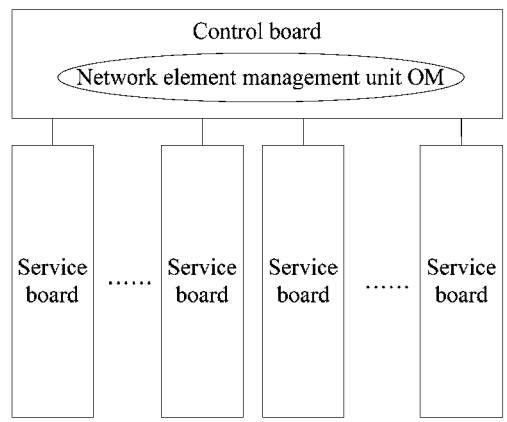
FIG. 1
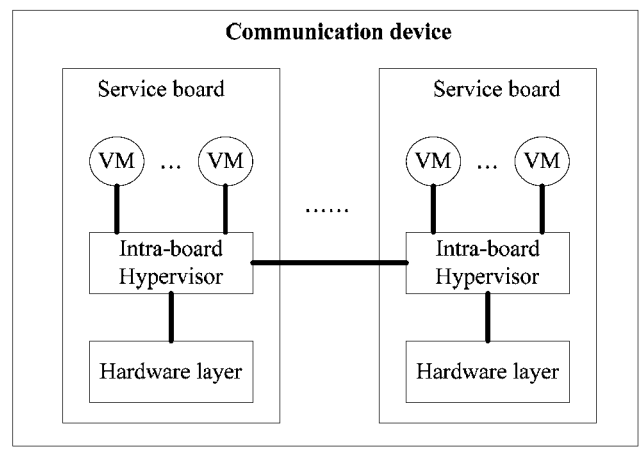
FIG. 2-a

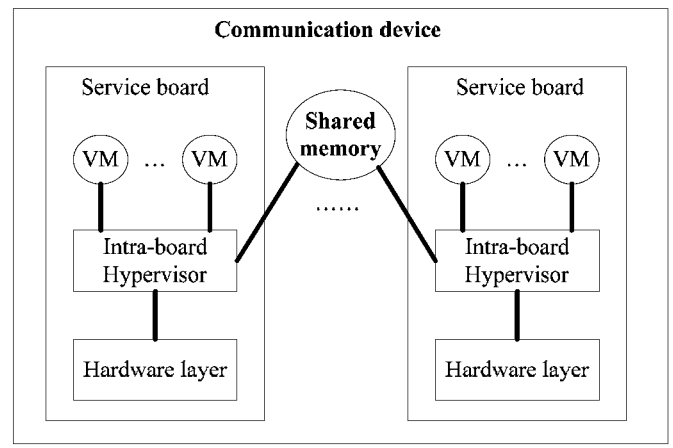
FIG. 2-b
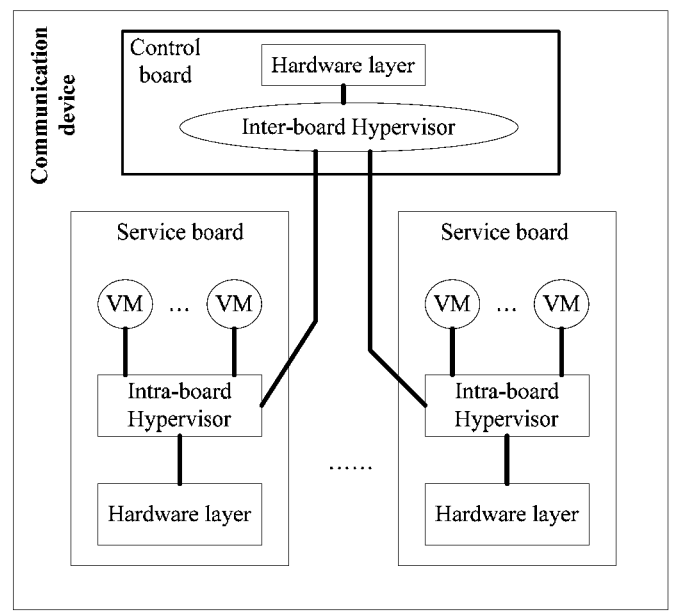
FIG. 2-c

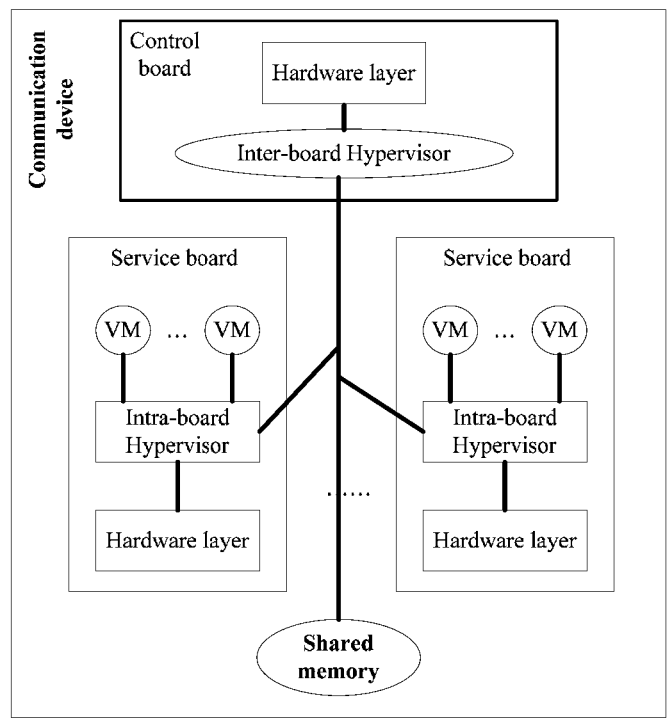
FIG. 2-d
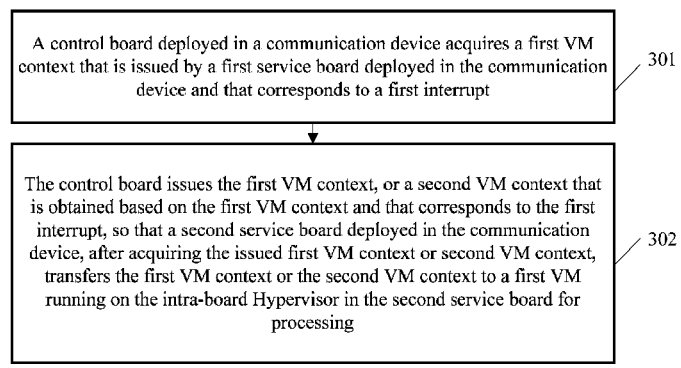
FIG. 3

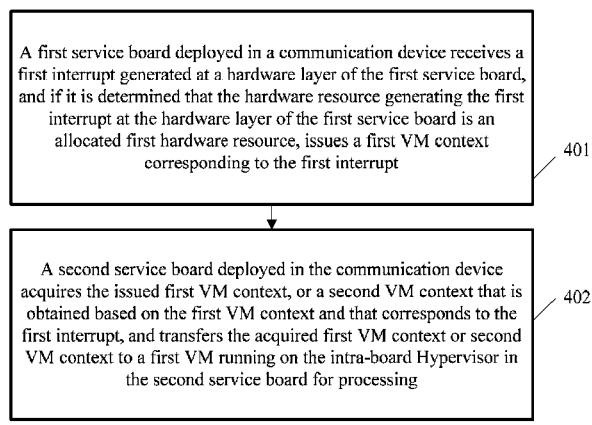
FIG. 4
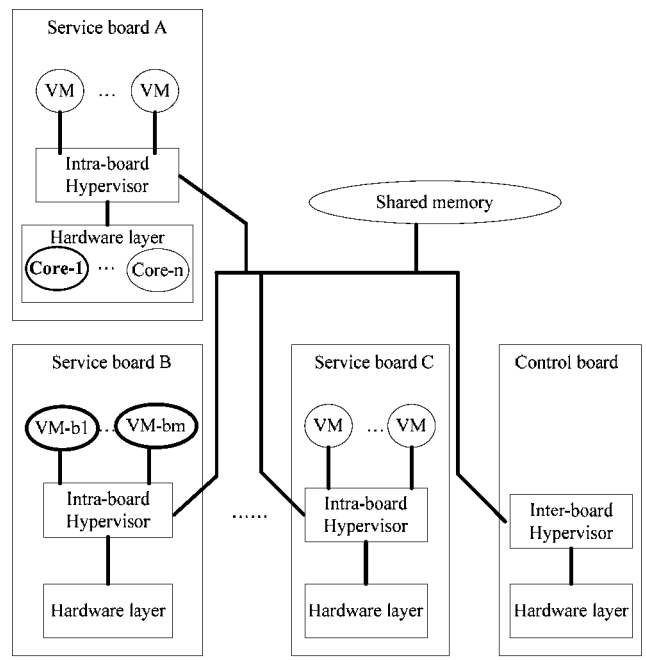
FIG. 5-a

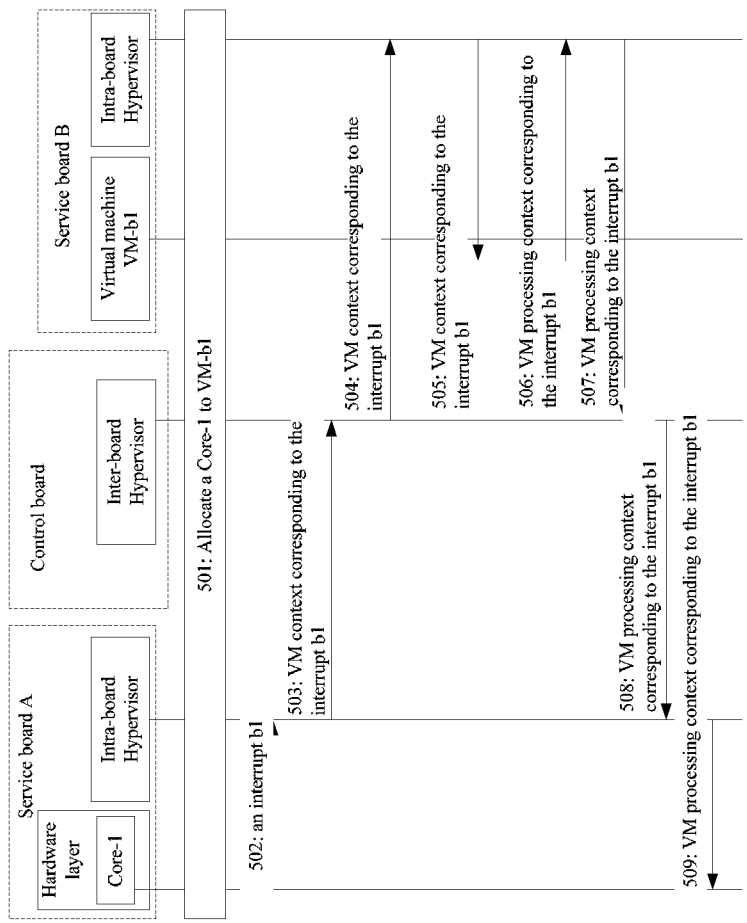
FIG. 5-b

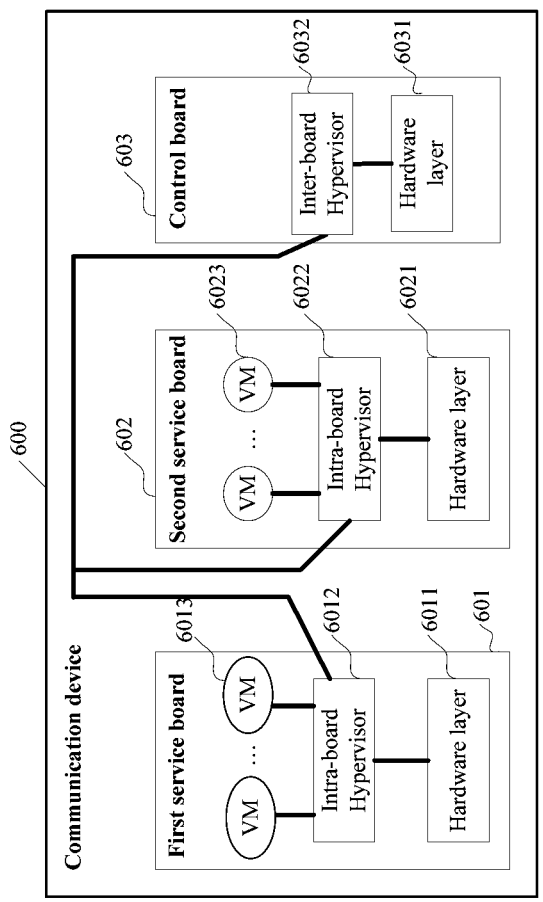
FIG. 6-a

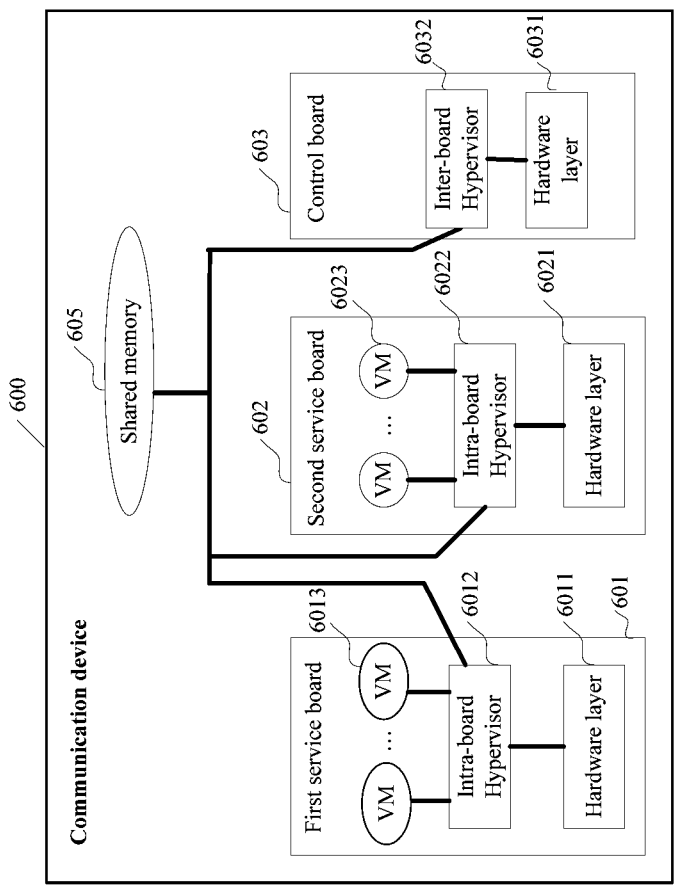
FIG. 6-b

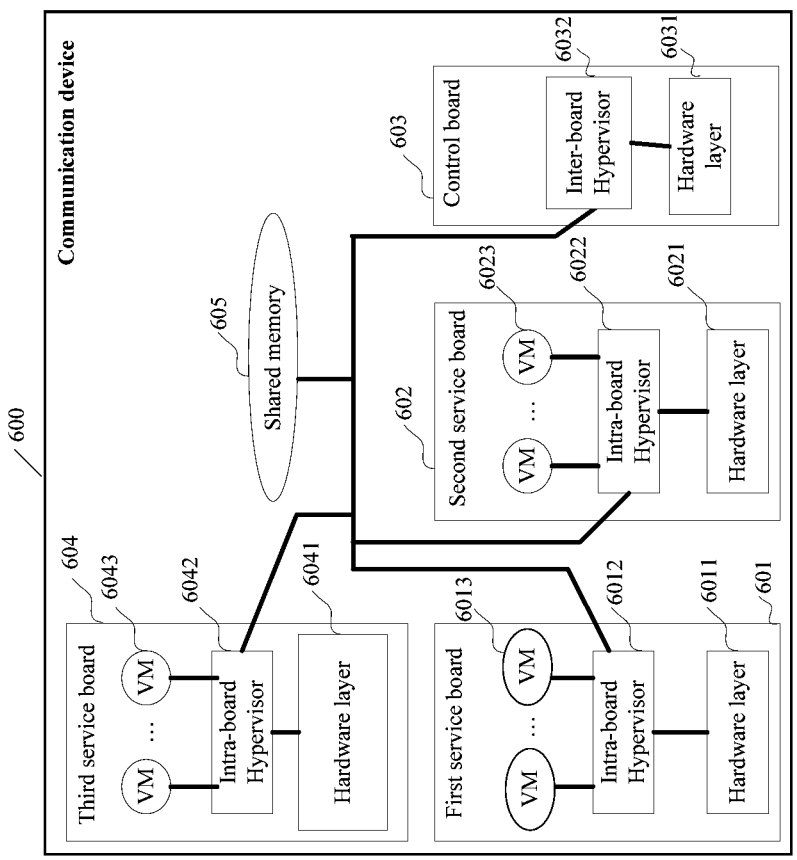
FIG. 6-c

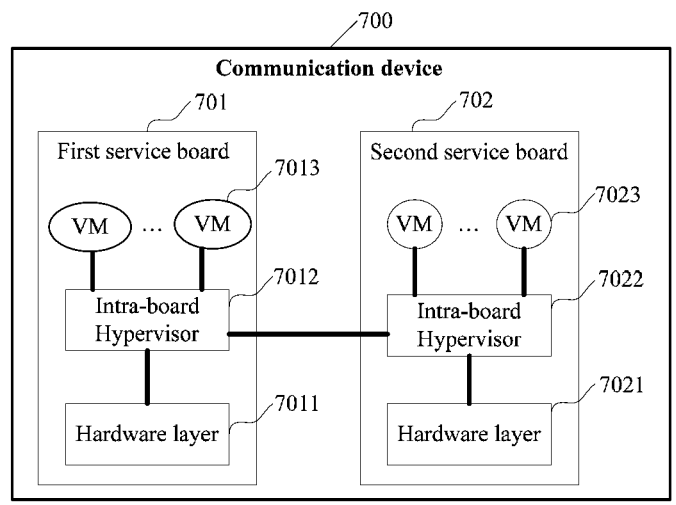
FIG. 7-a
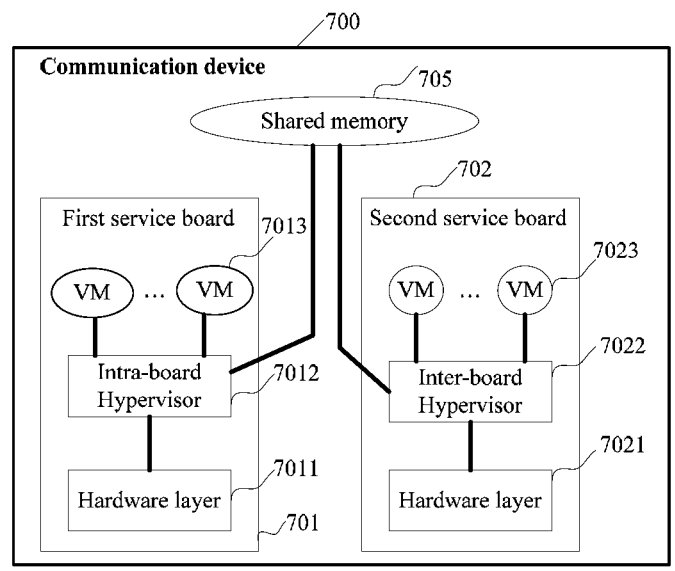
FIG. 7-b

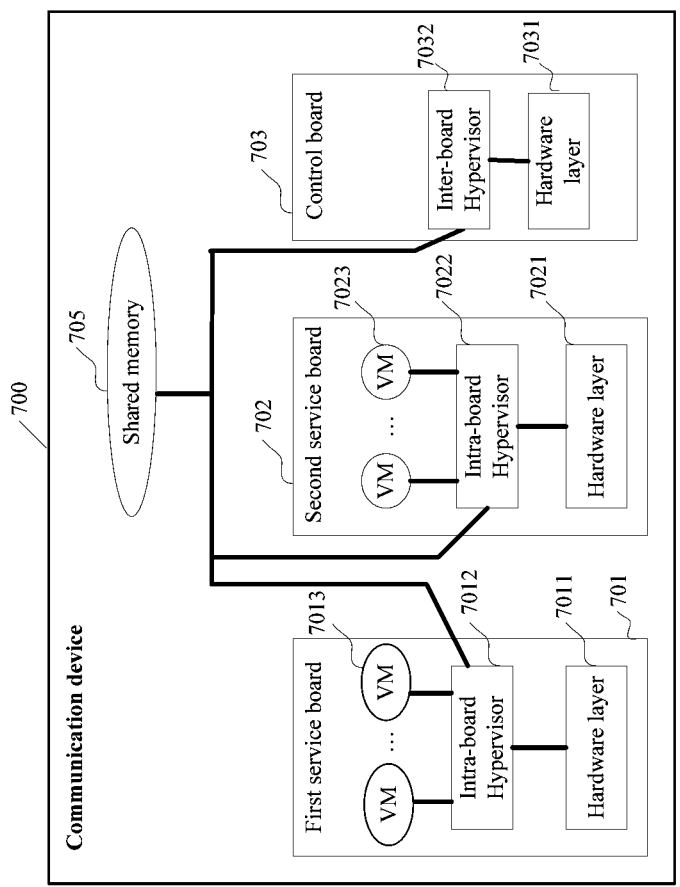
FIG. 7-c

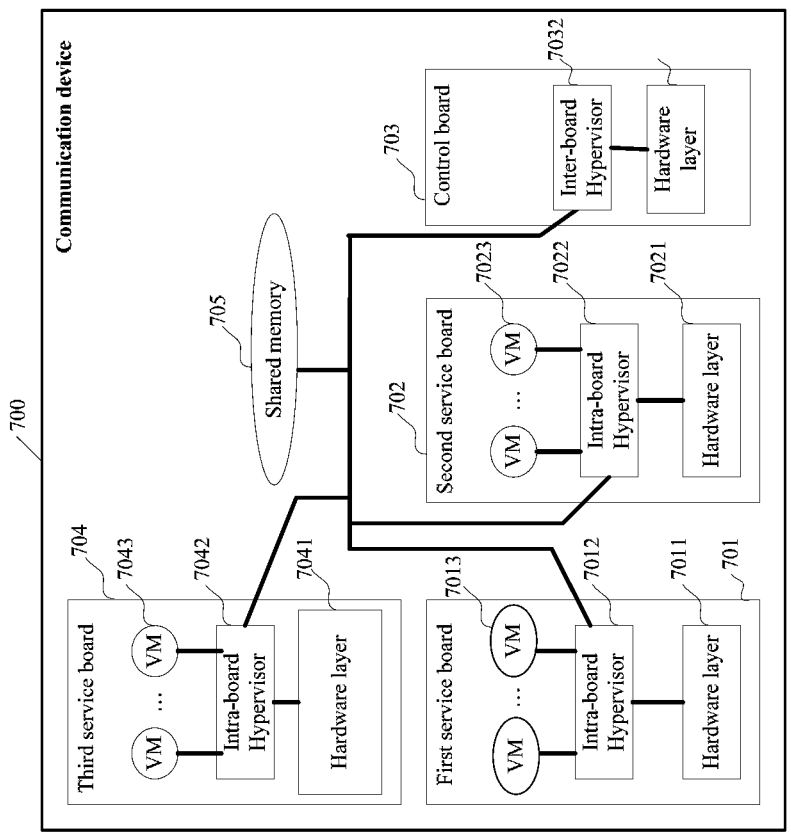
FIG. 7-d

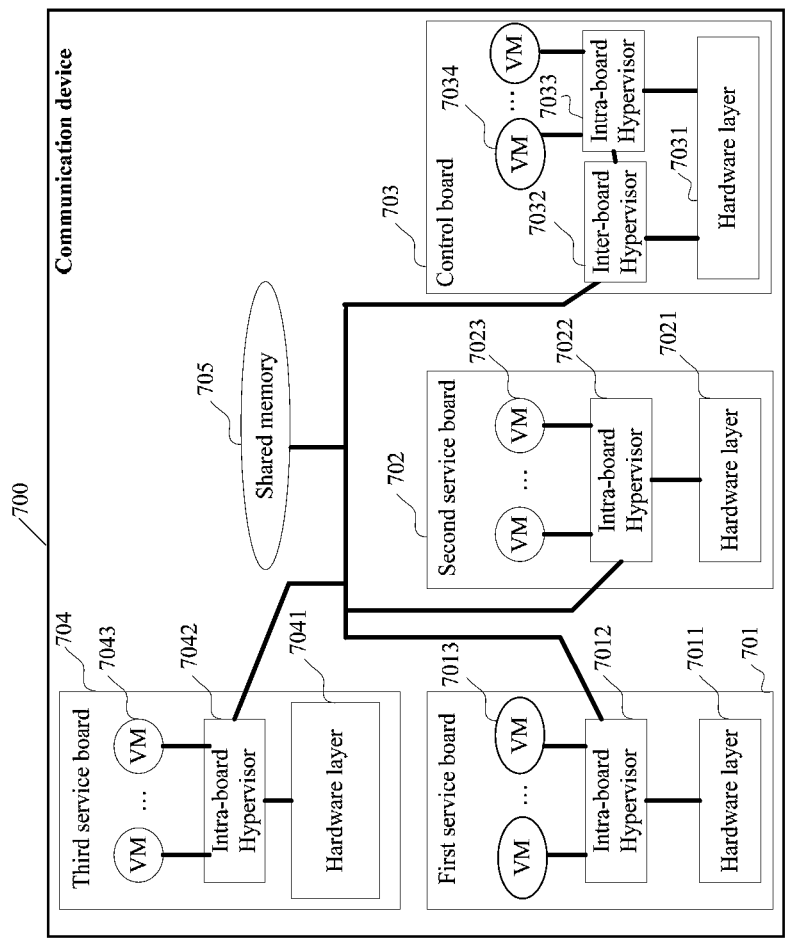
FIG. 7-e

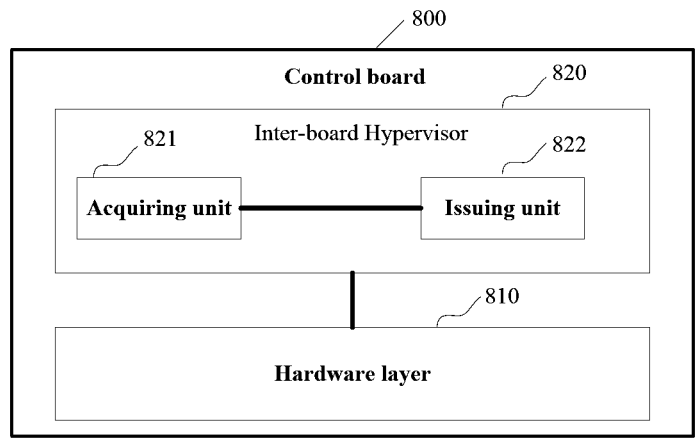
FIG. 8-a
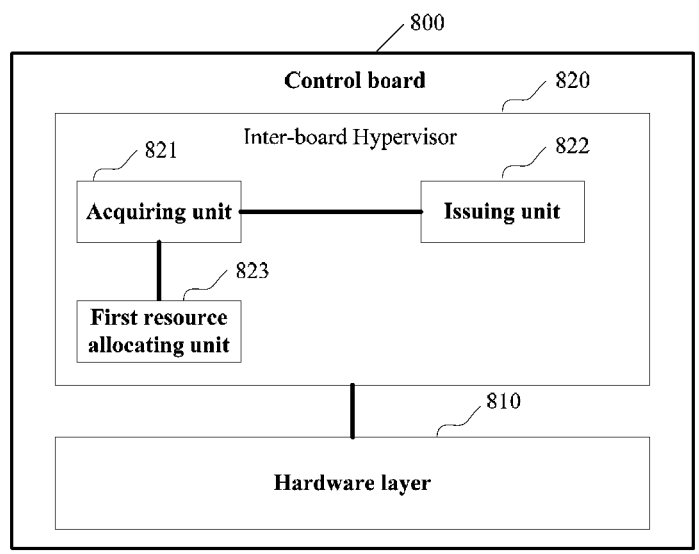
FIG. 8-b

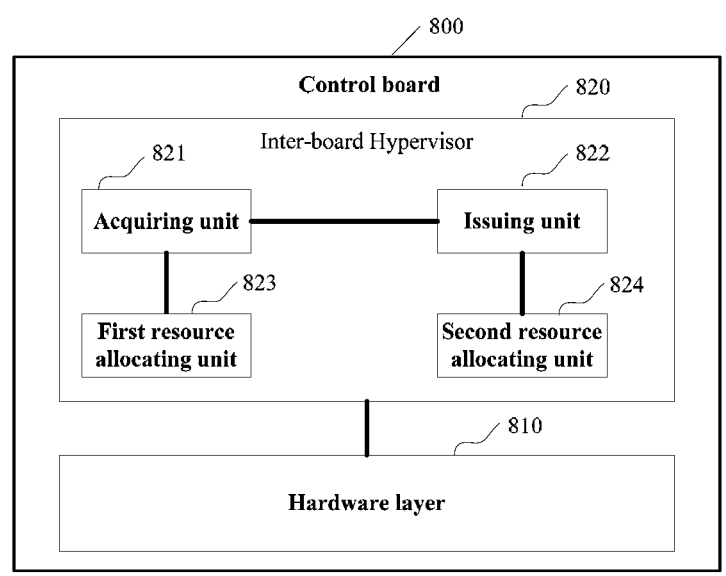
FIG. 8-c

INTER-BOARD VIRTUALIZATION MANAGEMENT FOR MANAGING HARDWARE RESOURCES CORRESPONDING TO INTERRUPTS

CROSS-REFERENCE TO RELATED APPLICATION

This application is a continuation of International Patent Application No. PCT/CN2013/070269, filed on Jan. 9, 2013, which claims priority to Chinese Patent Application No. 201210188613.3, filed on Jun. 8, 2012, both of which are hereby incorporated by reference in their entireties.

TECHNICAL FIELD

The present disclosure relates to the field of communications technologies, and in particular, to a virtualization management method and related apparatuses for managing hardware resources of a communication device.

BACKGROUND

Virtualization technology is a technology used to separate and decouple an underlying hardware device from an upper-layer operating system or application. Being one of key underlying technologies supporting the currently prevailing cloud computing (Cloud Computing) platform, the virtualization technology is capable of dramatically improving the resource usage efficiency for a physical device. Compared with a conventional physical server, a virtual machine (VM, Virtual Machine) running on a virtual platform has features such as better isolation and encapsulation.

Currently, a communication device (for example, a base station, a base station controller, a mobility management network element, and a data gateway) is generally deployed with a plurality of service boards and one control board. For a deployment manner, reference may be made to FIG. 1. To improve the usage efficiency for physical resources, the virtualization technology is deployed in each service board to achieve the maximum reasonable utilization of hardware resources of the service boards. In an application scenario, a service board of a communication device may be busy at some time and another service board may be idle at the same time, resulting in a waste of hardware resources of the communication device to a certain extent.

SUMMARY

Embodiments of the present disclosure provide a virtualization management method and related apparatuses for managing hardware resources of a communication device to optimize the utilization of hardware resources of the communication device and further boost performance.

In a first aspect, a virtualization management method for managing hardware resources of a communication device provided in an embodiment of the present disclosure may include: acquiring a first virtual machine context that is issued by a first service board deployed in a communication device and that corresponds to a first interrupt, where the first virtual machine context is issued by the first service board after the first service board determines that a first hardware resource generating the first interrupt at a hardware layer of the first service board is an allocated hardware resource in response to the first interrupt generated at the hardware layer of the first service board; and issuing the first virtual machine context, or a second virtual machine context that is obtained based on the first virtual machine context and that corresponds to the first interrupt, so that a second service board deployed in the communication device, after acquiring the first virtual machine context or the second virtual machine context, transfers the acquired first virtual machine context or second virtual machine context to a first virtual machine running on the intra-board Hypervisor in the second service board for processing, where the first virtual machine is the employer of the first hardware resource.

With reference to the first aspect, in a first feasible implementation manner, before the issuing a second virtual machine context that is obtained based on the first virtual machine context and that corresponds to the first interrupt, the method further includes:

if the first virtual machine context does not carry the employer identifier of the first hardware resource, adding the employer identifier of the first hardware resource to the first virtual machine context to obtain a second virtual machine context corresponding to the first interrupt.

With reference to the first aspect, in a second feasible implementation manner, the acquiring a first virtual machine context that is issued by a first service board deployed in a communication device and that corresponds to a first interrupt, includes: acquiring, from a shared memory, a first virtual machine context that is issued by the first service board to the shared memory and that corresponds to a first interrupt, or, receiving a first virtual machine context that is issued by the first service board and that corresponds to a first interrupt; and the issuing the first virtual machine context, or a second virtual machine context that is obtained based on the first virtual machine context and that corresponds to the first interrupt, includes: issuing the first virtual machine context, or a second virtual machine context that is obtained based on the first virtual machine context and that corresponds to the first interrupt, to a shared memory; or, after determining that the employer of the first hardware resource is the first virtual machine, and further determining according to the determined employer of the first hardware resource that a second virtual machine context corresponding to the first interrupt is to be issued to the second service board, issuing the first virtual machine context, or a second virtual machine context that is obtained based on the first virtual machine context and that corresponds to the first interrupt, to the second service board.

With reference to the first aspect, the first feasible implementation manner of the first aspect, or the second feasible implementation manner of the first aspect, in a third feasible implementation manner, before the acquiring a first virtual machine context that is issued by a first service board deployed in a communication device and that corresponds to a first interrupt, the method further includes:

if it is detected that the current hardware resource usage of a hardware layer of the second service board exceeds a first threshold, or a first hardware resource alarm instruction issued by the second service board is acquired, and if it is determined that the current hardware resource usage of the hardware layer of the first service board is lower than a second threshold, instructing the first service board to migrate resources to free a first hardware resource at the hardware layer of the first service board, and allocating the freed first hardware resource at the hardware layer of the first service board, to a first virtual machine running on the intra-board Hypervisor in the second service board, where the first hardware resource alarm instruction is issued by the second service board after the current hardware resource usage of the hardware layer of the second service board exceeds the first threshold, which is higher than, lower than, or equal to the second threshold;

or, if it is detected that the current hardware resource usage of a hardware layer of the second service board exceeds a first threshold, or a first hardware resource alarm instruction issued by the second service board is acquired, and if it is determined that the hardware layer of the first service board currently has an idle first hardware resource, allocating the idle first hardware resource at the hardware layer of the first service board, to a first virtual machine running on the intra-board Hypervisor in the second service board, where the first hardware resource alarm instruction is issued by the second service board after the current hardware resource usage of the hardware layer of the second service board exceeds the first threshold, which is higher than, lower than, or equal to the second threshold.

With reference to the third feasible implementation manner of the first aspect, in a fourth feasible implementation manner, after the issuing the first virtual machine context, or a second virtual machine context that is obtained based on the first virtual machine context and that corresponds to the first interrupt, the method further includes:

if it is detected that the current hardware resource usage of the hardware layer of the first service board exceeds the first threshold, or if a second hardware resource alarm instruction issued by the first service board is acquired, re-allocating the allocated first hardware resource at the hardware layer of the first service board to a virtual machine running on the intra-board Hypervisor in the first service board, where the second hardware resource alarm instruction is issued by the first service board after the current hardware resource usage of the hardware layer of the first service board exceeds the first threshold.

With reference to the third feasible implementation manner of the first aspect or the fourth feasible implementation manner of the first aspect, in a fifth feasible implementation manner, where the communication device is further deployed with a third service board, the method further includes:

if it is detected that the current hardware resource usage of the hardware layer of the second service board exceeds the first threshold, or a third hardware resource alarm instruction issued by the second service board is acquired, and if it is determined that the current hardware resource usage of a hardware layer of the third service board is lower than the second threshold, instructing the third service board to migrate resources to free a second hardware resource at the hardware layer of the third service board, and allocating the freed second hardware resource at the hardware layer of the third service board to a second virtual machine or the first virtual machine running on the intra-board Hypervisor in the second service board, where the third hardware resource alarm instruction is issued by the second service board after the current hardware resource usage of the hardware layer of the second service board exceeds the first threshold; and if a third virtual machine context that is issued by the third service board and that corresponds to a second interrupt is acquired, where the third virtual machine context is issued by the third service board after the third service board determines that the second hardware resource generating the second interrupt at the hardware layer of the third service board is an allocated hardware resource in response to the second interrupt generated at the hardware layer of the third service board, issuing the third virtual machine context, or a fourth virtual machine context that is obtained based on the third virtual machine context and that corresponds to the second interrupt, so that the second service board, after acquiring the third virtual machine context or the fourth virtual machine context, transfers the acquired third virtual machine context or fourth virtual machine context to a first virtual machine or the second virtual machine running on the intra-board Hypervisor in the second service board for processing;

or, if it is detected that the current hardware resource usage of the hardware layer of the second service board exceeds the first threshold, or a third hardware resource alarm instruction issued by the second service board is acquired, and if it is determined that a hardware layer of the third service board currently has an idle second hardware resource, allocating the idle second hardware resource at the hardware layer of the third service board to a second virtual machine or the first virtual machine running on the intra-board Hypervisor in the second service board, where the third hardware resource alarm instruction is issued by the second service board after the current hardware resource usage of the hardware layer of the second service board exceeds the first threshold; and if a third virtual machine context that is issued by the third service board and that corresponds to a second interrupt is acquired, where the third virtual machine context is issued by the third service board after the third service board determines that the second hardware resource generating the second interrupt at the hardware layer of the third service board is an allocated hardware resource in response to the second interrupt generated at the hardware layer of the third service board, issuing the third virtual machine context, or a fourth virtual machine context that is obtained based on the third virtual machine context and that corresponds to the second interrupt, so that the second service board, after acquiring the third virtual machine context or the fourth virtual machine context, transfers the acquired third virtual machine context or fourth virtual machine context to a second virtual machine or the first virtual machine running on the intra-board Hypervisor in the second service board for processing.

Additionally, in a second aspect, another virtualization management method for managing hardware resources of a communication device provided in the present disclosure may include: receiving, by a first service board deployed in a communication device, a first interrupt generated at a hardware layer of the first service board, and issuing, by the first service board, a first virtual machine context corresponding to the first interrupt, if it is determined that the hardware resource generating the first interrupt at the hardware layer of the first service board is an allocated first hardware resource; and acquiring, by a second service board deployed in the communication device, the issued first virtual machine context, or a second virtual machine context that is obtained based on the first virtual machine context and that corresponds to the first interrupt, and transferring the acquired first virtual machine context or second virtual machine context to a first virtual machine running on the intra-board Hypervisor in the second service board for processing, where the first virtual machine is the employer of the first hardware resource.

With reference to the second aspect, in a first feasible implementation manner, the issuing a first virtual machine context corresponding to a first interrupt, includes:

issuing a first virtual machine context corresponding to a first interrupt to a shared memory; and the acquiring the issued first virtual machine context, or a second virtual machine context that is obtained based on the first virtual machine context and that corresponds to the first interrupt, includes: acquiring the first virtual machine context from the shared memory, or acquiring a second virtual machine context that is obtained based on the first virtual machine context acquired from the shared memory and that corresponds to the first interrupt;

or, the issuing a first virtual machine context corresponding to a first interrupt, includes:

issuing a first virtual machine context corresponding to a first interrupt to a shared memory; and the acquiring the issued first virtual machine context, or a second virtual machine context that is obtained based on the first virtual machine context and that corresponds to the first interrupt, includes: receiving the first virtual machine context, or a second virtual machine context that is obtained based on the first virtual machine context and that corresponds to the first interrupt, where the first virtual machine context or the second virtual machine context is issued by a control board deployed in the communication device after the control board acquires the first virtual machine context from the shared memory;

or, the issuing a first virtual machine context corresponding to a first interrupt, includes:

issuing a first virtual machine context corresponding to a first interrupt to a control board deployed in the communication device; and the acquiring the issued first virtual machine context, or a second virtual machine context that is obtained based on the first virtual machine context and that corresponds to the first interrupt, includes: receiving the first virtual machine context, or a second virtual machine context that is obtained based on the first virtual machine context and that corresponds to the first interrupt, where the first virtual machine context or the second virtual machine context is issued by the control board;

or, the issuing a first virtual machine context corresponding to a first interrupt, includes:

issuing a first virtual machine context corresponding to a first interrupt to a control board deployed in the communication device; and the acquiring the issued first virtual machine context, or a second virtual machine context that is obtained based on the first virtual machine context and that corresponds to the first interrupt, includes: acquiring, from a shared memory, the first virtual machine context, or a second virtual machine context that is obtained based on the first virtual machine context and that corresponds to the first interrupt, where the first virtual machine context or the second virtual machine context is issued to the shared memory by the control board.

With reference to the second aspect or the first feasible implementation manner of the second aspect, in a second feasible implementation manner, before the issuing a first virtual machine context corresponding to a first interrupt, the method further includes:

if a control board deployed in the communication device detects that the current hardware resource usage of a hardware layer of the second service board exceeds a first threshold, or acquires a first hardware resource alarm instruction issued by the second service board, and if the control board determines that the current hardware resource usage of the hardware layer of the first service board is lower than a second threshold, instructing, by the control board, the first service board to migrate resources to free a first hardware resource at the hardware layer of the first service board, and, allocating, by the control board, the freed first hardware resource at the hardware layer of the first service board, to a first virtual machine running on the intra-board Hypervisor in the second service board, where the first hardware resource alarm instruction is issued by the second service board after the current hardware resource usage of the hardware layer of the second service board exceeds the first threshold, which is higher than, lower than, or equal to the second threshold;

or, if a control board deployed in the communication device detects that the current hardware resource usage of a hardware layer of the second service board exceeds a first threshold, or acquires a first hardware resource alarm instruction issued by the second service board, and if the control board determines that the hardware layer of the first service board currently has an idle first hardware resource, allocating, by the control board, the idle first hardware resource at the hardware layer of the first service board, to a first virtual machine running on the intra-board Hypervisor in the second service board, where the first hardware resource alarm instruction is issued by the second service board after the current hardware resource usage of the hardware layer of the second service board exceeds the first threshold, which is higher than, lower than, or equal to the second threshold.

With reference to the second feasible implementation manner of the second aspect, in a third feasible implementation manner, after the issuing a first virtual machine context corresponding to a first interrupt, the method further includes:

if a control board deployed in the communication device detects that the current hardware resource usage of the hardware layer of the first service board exceeds the first threshold, or acquires a second hardware resource alarm instruction issued by the first service board, re-allocating, by the control board, the allocated first hardware resource at the hardware layer of the first service board, to a virtual machine running on the intra-board Hypervisor in the first service board, where the second hardware resource alarm instruction is issued by the first service board after the current hardware resource usage of the hardware layer of the first service board exceeds the first threshold.

With reference to the second feasible implementation manner of the second aspect or the third feasible implementation manner of the second aspect, in a fourth feasible implementation manner, where the communication device is further deployed with a third service board, the method further includes:

if a control board deployed in the communication device detects that the current hardware resource usage of the hardware layer of the second service board exceeds the first threshold, or acquires a third hardware resource alarm instruction issued by the second service board, and if the control board determines that the current hardware resource usage of a hardware layer of the third service board is lower than the second threshold, instructing, by the control board, the third service board to migrate resources to free a second hardware resource at the hardware layer of the third service board, and, allocating, by the control board, the freed second hardware resource at the hardware layer of the third service board, to a second virtual machine or the first virtual machine running on the intra-board Hypervisor in the second service board, where the third hardware resource alarm instruction is issued by the second service board after the current hardware resource usage of the hardware layer of the second service board exceeds the first threshold;

if the third service board receives a second interrupt generated at the hardware layer of the third service board and determines that the hardware resource generating the second interrupt at the hardware layer of the third service board is the allocated second hardware resource, issuing, by the third service board, a third virtual machine context corresponding to the second interrupt; and acquiring, by the second service board, the issued third virtual machine context, or a fourth virtual machine context that is obtained based on the third virtual machine context and that corresponds to the second interrupt, and transferring, by the second service board, the acquired third virtual machine context or fourth virtual machine context to the second virtual machine or the first virtual machine running on the intra-board Hypervisor in the second service board for processing;

or, after the issuing a first virtual machine context corresponding to a first interrupt, the method further includes:

if a control board deployed in the communication device detects that the current hardware resource usage of the hardware layer of the second service board exceeds the first threshold, or acquires a third hardware resource alarm instruction issued by the second service board, and if the control board determines that a hardware layer of the third service board currently has an idle second hardware resource, allocating, by the control board, the idle second hardware resource at the hardware layer of the third service board, to a second virtual machine or the first virtual machine running on the intra-board Hypervisor in the second service board, where the third hardware resource alarm instruction is issued by the second service board after the current hardware resource usage of the hardware layer of the second service board exceeds the first threshold;

if the third service board receives a second interrupt generated at the hardware layer of the third service board and determines that the hardware resource generating the second interrupt at the hardware layer of the third service board is the allocated second hardware resource, issuing, by the third service board, a third virtual machine context corresponding to the second interrupt; and acquiring, by the second service board, the issued third virtual machine context, or a fourth virtual machine context that is obtained based on the third virtual machine context and that corresponds to the second interrupt, and transferring, by the second service board, the acquired third virtual machine context or fourth virtual machine context to the second virtual machine or the first virtual machine running on the intra-board Hypervisor in the second service board for processing.

With reference to the second feasible implementation manner of the second aspect, the third feasible implementation manner of the second aspect, or the fourth feasible implementation manner of the second aspect, in a fifth feasible implementation manner, the method further includes:

if a control board deployed in the communication device detects that the current hardware resource usage of the hardware layer of the second service board exceeds the first threshold, or acquires a fourth hardware resource alarm instruction issued by the second service board, and if the control board determines that the current hardware resource usage of a hardware layer of the control board is lower than the second threshold, migrating, by the control board, resources to free a third hardware resource at the hardware layer of the control board, and, allocating, by the control board, the freed third hardware resource at the hardware layer of the control board, to a second virtual machine or the first virtual machine or a fifth virtual machine running on the intra-board Hypervisor in the second service board, where the fourth hardware resource alarm instruction is issued by the second service board after the current hardware resource usage of the hardware layer of the second service board exceeds the first threshold;

if the control board receives a third interrupt generated at the hardware layer of the control board and determines that the hardware resource generating the third interrupt at the hardware layer of the control board is the allocated third hardware resource, issuing, by the control board, a fifth virtual machine context corresponding to the third interrupt; and acquiring, by the second service board, the issued fifth virtual machine context, or a sixth virtual machine context that is obtained based on the fifth virtual machine context and that corresponds to the third interrupt, and transferring, by the second service board, the acquired fifth virtual machine context or sixth virtual machine context to the second virtual machine or a first virtual machine or a fifth virtual machine running on the intra-board Hypervisor in the second service board for processing;

or, the method further includes:

if the control board detects that the current hardware resource usage of the hardware layer of the second service board exceeds a first threshold, or acquires a fourth hardware resource alarm instruction issued by the second service board, and if the control board determines that a hardware layer of the control board currently has an idle third hardware resource, allocating, by the control board, the idle third hardware resource at the hardware layer of the control board, to a second virtual machine or the first virtual machine or a fifth virtual machine running on the intra-board Hypervisor in the second service board, where the fourth hardware resource alarm instruction is issued by the second service board after the current hardware resource usage of the hardware layer of the second service board exceeds the first threshold;

if the control board receives a third interrupt generated at the hardware layer of the control board and determines that the hardware resource generating the third interrupt at the hardware layer of the control board is the allocated third hardware resource, issuing, by the control board, a fifth virtual machine context corresponding to the third interrupt; and acquiring, by the second service board, the issued fifth virtual machine context, or a sixth virtual machine context that is obtained based on the fifth virtual machine context and that corresponds to the third interrupt, and transferring, by the second service board, the acquired fifth virtual machine context or sixth virtual machine context to the second virtual machine or a first virtual machine or a fifth virtual machine running on the intra-board Hypervisor in the second service board for processing.

In addition, in a third aspect, a control board provided in an embodiment of the present disclosure, where the control board is used in a communication device, includes a hardware layer and an inter-board Hypervisor running on the hardware layer, where the inter-board Hypervisor includes an acquiring unit and an issuing unit;

where, the acquiring unit is configured to acquire a first virtual machine context that is issued by a first service board deployed in the communication device and that corresponds to a first interrupt, where the first virtual machine context is issued by the first service board after the first service board determines that a first hardware resource generating the first interrupt at a hardware layer of the first service board is an allocated hardware resource in response to the first interrupt generated at the hardware layer of the first service board; and the issuing unit is configured to issue the first virtual machine context, or a second virtual machine context that is obtained based on the first virtual machine context and that corresponds to the first interrupt, so that a second service board deployed in the communication device, after acquiring the first virtual machine context or the second virtual machine context, transfers the acquired first virtual machine context or second virtual machine context to a first virtual machine running on the intra-board Hypervisor in the second service board, where the first virtual machine is the employer of the first hardware resource.

With reference to the third aspect, in a first feasible implementation manner, the acquiring unit is specifically configured to acquire, from a shared memory, a first virtual machine context that is issued by the first service board to the shared memory and that corresponds to a first interrupt, or, to receive a first virtual machine context that is issued by the first service board and that corresponds to a first interrupt; and the issuing unit is specifically configured to issue the first virtual machine context, or a second virtual machine context that is obtained based on the first virtual machine context and that corresponds to the first interrupt, to a shared memory, or, after determining that the employer of the first hardware resource is the first virtual machine, and further determining according to the determined employer of the first hardware resource that a second virtual machine context corresponding to the first interrupt is to be issued to the second service board, to issue the first virtual machine context, or a second virtual machine context that is obtained based on the first virtual machine context and that corresponds to the first interrupt, to the second service board.

With reference to the third aspect or the first feasible implementation manner of the third aspect, in a second feasible implementation manner, the inter-board Hypervisor further includes a first resource allocating unit, where, the first resource allocating unit is configured to: before the acquiring unit acquires a first virtual machine context that is issued by a first service board deployed in a communication device and that corresponds to a first interrupt, if it is detected that the current hardware resource usage of a hardware layer of the second service board exceeds a first threshold, or a first hardware resource alarm instruction issued by the second service board is acquired, and if it is determined that the current hardware resource usage of the hardware layer of the first service board is lower than a second threshold, instruct the first service board to migrate resources to free a first hardware resource at the hardware layer of the first service board, and allocate the freed first hardware resource at the hardware layer of the first service board, to a first virtual machine running on the intra-board Hypervisor in the second service board, where the first hardware resource alarm instruction is issued by the second service board after the current hardware resource usage of the hardware layer of the second service board exceeds the first threshold, which is higher than, lower than, or equal to the second threshold;

or, the first resource allocating unit is configured to: before the acquiring unit acquires a first virtual machine context that is issued by a first service board deployed in a communication device and that corresponds to a first interrupt, if it is detected that the current hardware resource usage of a hardware layer of the second service board exceeds a first threshold, or a first hardware resource alarm instruction issued by the second service board is acquired, and if it is determined that the hardware layer of the first service board currently has an idle first hardware resource, allocate the idle first hardware resource at the hardware layer of the first service board, to a first virtual machine running on the intra-board Hypervisor in the second service board, where the first hardware resource alarm instruction is issued by the second service board after the current hardware resource usage of the hardware layer of the second service board exceeds the first threshold, which is higher than, lower than, or equal to the second threshold.

With reference to the second feasible implementation manner of the third aspect, in a third feasible implementation manner, the inter-board Hypervisor further includes:

a second resource allocating unit, configured to: after the issuing unit issues the first virtual machine context or the second virtual machine context, if it is detected that the current hardware resource usage of the hardware layer of the first service board exceeds the first threshold, or if a second hardware resource alarm instruction issued by the first service board is acquired, re-allocate the allocated first hardware resource at the hardware layer of the first service board to a virtual machine running on the intra-board Hypervisor in the first service board, where the second hardware resource alarm instruction is issued by the first service board after the current hardware resource usage of the hardware layer of the first service board exceeds the first threshold.

With reference to the second feasible implementation manner of the third aspect or the third feasible implementation manner of the third aspect, in a fourth feasible implementation manner, where the communication device is further deployed with a third service board, the first resource allocating unit is further configured to: if it is detected that the current hardware resource usage of the hardware layer of the second service board exceeds the first threshold, or a third hardware resource alarm instruction issued by the second service board is acquired, and if it is determined that the current hardware resource usage of a hardware layer of the third service board is lower than the second threshold, instruct the third service board to migrate resources to free a second hardware resource at the hardware layer of the third service board, and allocate the freed second hardware resource at the hardware layer of the third service board to a second virtual machine or the first virtual machine running on the intra-board Hypervisor in the second service board, where the third hardware resource alarm instruction is issued by the second service board after the current hardware resource usage of the hardware layer of the second service board exceeds the first threshold;

where, the acquiring unit is further configured to acquire a third virtual machine context that is issued by the third service board and that corresponds to a second interrupt, where the third virtual machine context is issued by the third service board after the third service board determines that the second hardware resource generating the second interrupt at the hardware layer of the third service board is an allocated hardware resource in response to the second interrupt generated at the hardware layer of the third service board; and the issuing unit is further configured to issue the third virtual machine context, or a fourth virtual machine context that is obtained based on the third virtual machine context and that corresponds to the second interrupt, so that the second service board, after acquiring the third virtual machine context or the fourth virtual machine context, transfers the acquired third virtual machine context or fourth virtual machine context to the second virtual machine or the first virtual machine running on the intra-board Hypervisor in the second service board for processing;

or, the first resource allocating unit is further configured to: if it is detected that the current hardware resource usage of the hardware layer of the second service board exceeds the first threshold, or a third hardware resource alarm instruction issued by the second service board is acquired, and if it is determined that a hardware layer of the third service board currently has an idle second hardware resource, allocate the idle second hardware resource at the hardware layer of the third service board to a second virtual machine or the first virtual machine running on the intra-board Hypervisor in the second service board, where the third hardware resource alarm instruction is issued by the second service board after the current hardware resource usage of the hardware layer of the second service board exceeds the first threshold;

where, the acquiring unit is further configured to acquire a third virtual machine context that is issued by the third service board and that corresponds to a second interrupt; and if the acquiring unit acquires the third virtual machine context, where the third virtual machine context is issued by the third service board after the third service board determines that the second hardware resource generating the second interrupt at the hardware layer of the third service board is an allocated hardware resource in response to the second interrupt generated at the hardware layer of the third service board; and the issuing unit is further configured to issue the third virtual machine context, or a fourth virtual machine context that is obtained based on the third virtual machine context and that corresponds to the second interrupt, so that the second service board, after acquiring the third virtual machine context or the fourth virtual machine context, transfers the acquired third virtual machine context or fourth virtual machine context to the second virtual machine or the first virtual machine running on the intra-board Hypervisor in the second service board for processing.

In addition, in a fourth aspect, a communication device provided in the present disclosure includes a first service board, a second service board, and a control board, where each of the first service board and the second service board includes a hardware layer, an intra-board Hypervisor running on the hardware layer, and at least one virtual machine running on the intra-board Hypervisor, and the control board includes a hardware layer and an inter-board Hypervisor running on the hardware layer, where:

the intra-board Hypervisor in the first service board is configured to issue a first virtual machine context corresponding to a first interrupt after responding to the first interrupt generated at the hardware layer of the first service board and determining that a first hardware resource generating the first interrupt at the hardware layer of the first service board is an allocated hardware resource;

the inter-board Hypervisor in the control board is configured to acquire the first virtual machine context and issue the first virtual machine context, or a second virtual machine context that is obtained based on the first virtual machine context and that corresponds to the first interrupt; and the intra-board Hypervisor in the second service board is configured to: after acquiring the issued first virtual machine context or second virtual machine context, transfer the acquired first virtual machine context or second virtual machine context to a first virtual machine running on the intra-board Hypervisor in the second service board for processing, where the first virtual machine is the employer of the first hardware resource.

With reference to the fourth aspect, in a first feasible implementation manner, the inter-board Hypervisor is specifically configured to acquire, from a shared memory, a first virtual machine context that is issued by the first service board to the shared memory and that corresponds to a first interrupt, or to receive a first virtual machine context that is issued by the first service board and that corresponds to a first interrupt; and to issue the first virtual machine context, or a second virtual machine context that is obtained based on the first virtual machine context and that corresponds to the first interrupt, to a shared memory;

or, the inter-board Hypervisor is specifically configured to acquire, from a shared memory, a first virtual machine context that is issued by the first service board to the shared memory and that corresponds to a first interrupt, or to receive a first virtual machine context that is issued by the first service board and that corresponds to a first interrupt; and, after determining that the employer of the first hardware resource is the first virtual machine, and further determining according to the determined employer of the first hardware resource that a second virtual machine context corresponding to the first interrupt is to be issued to the second service board, to issue the first virtual machine context, or a second virtual machine context that is obtained based on the first virtual machine context and that corresponds to the first interrupt, to the second service board.

With reference to the fourth aspect or the first feasible implementation manner of the fourth aspect, in a second feasible implementation manner, the inter-board Hypervisor is further configured to: before acquiring a first virtual machine context that is issued by the intra-board Hypervisor in the first service board and that corresponds to a first interrupt, if it is detected that the current hardware resource usage of the hardware layer of the second service board exceeds a first threshold, or a first hardware resource alarm instruction issued by the second service board is acquired, and if it is determined that the current hardware resource usage of the hardware layer of the first service board is lower than a second threshold, instruct the first service board to migrate resources to free a first hardware resource at the hardware layer of the first service board, and allocate the freed first hardware resource at the hardware layer of the first service board, to a first virtual machine running on the intra-board Hypervisor in the second service board, where the first hardware resource alarm instruction is issued by the second service board after the current hardware resource usage of the hardware layer of the second service board exceeds the first threshold, which is higher than, lower than, or equal to the second threshold;

or, the inter-board Hypervisor is further configured to: before acquiring a first virtual machine context that is issued by the intra-board Hypervisor in the first service board and that corresponds to a first interrupt, if it is detected that the current hardware resource usage of the hardware layer of the second service board exceeds a first threshold, or a first hardware resource alarm instruction issued by the second service board is acquired, and if it is determined that the hardware layer of the first service board currently has an idle first hardware resource, allocate the idle first hardware resource at the hardware layer of the first service board, to a first virtual machine running on the intra-board Hypervisor in the second service board, where the first hardware resource alarm instruction is issued by the second service board after the current hardware resource usage of the hardware layer of the second service board exceeds the first threshold, which is higher than, lower than, or equal to the second threshold.

With reference to the second feasible implementation manner of the fourth aspect, in a third feasible implementation manner, the inter-board Hypervisor is further configured to: after issuing the first virtual machine context, or a second virtual machine context that is obtained based on the first virtual machine context and that corresponds to the first interrupt, if it is detected that the current hardware resource usage of the hardware layer of the first service board exceeds the first threshold, or if a second hardware resource alarm instruction issued by the first service board is acquired, re-allocate the allocated first hardware resource at the hardware layer of the first service board to a virtual machine running on the intra-board Hypervisor in the first service board, where the second hardware resource alarm instruction is issued by the first service board after the current hardware resource usage of the hardware layer of the first service board exceeds the first threshold.

With reference to the second feasible implementation manner of the fourth aspect or the third feasible implementation manner of the fourth aspect, in a fourth feasible implementation manner, the communication device is further deployed with a third service board, where the third service board includes a hardware layer, an intra-board Hypervisor running on the hardware layer, and at least one virtual machine running on the intra-board Hypervisor, where:

the inter-board Hypervisor is further configured to: if it is detected that the current hardware resource usage of the hardware layer of the second service board exceeds the first threshold, or a third hardware resource alarm instruction issued by the second service board is acquired, and if it is determined that the current hardware resource usage of a hardware layer of the third service board is lower than the second threshold, instruct the third service board to migrate resources to free a second hardware resource at the hardware layer of the third service board, and allocate the freed second hardware resource at the hardware layer of the third service board to a second virtual machine or the first virtual machine running on the intra-board Hypervisor in the second service board, where the third hardware resource alarm instruction is issued by the second service board after the current hardware resource usage of the hardware layer of the second service board exceeds the first threshold; and acquire a third virtual machine context that is issued by the third service board and that corresponds to a second interrupt, where the third virtual machine context is issued by the third service board after the third service board determines that the second hardware resource generating the second interrupt at the hardware layer of the third service board is an allocated hardware resource in response to the second interrupt generated at the hardware layer of the third service board, issue the third virtual machine context, or a fourth virtual machine context that is obtained based on the third virtual machine context and that corresponds to the second interrupt, so that the second service board, after acquiring the third virtual machine context or the fourth virtual machine context, transfers the acquired third virtual machine context or fourth virtual machine context to the second virtual machine or the first virtual machine running on the intra-board Hypervisor in the second service board for processing;

or, the inter-board Hypervisor is further configured to: if it is detected that the current hardware resource usage of the hardware layer of the second service board exceeds the first threshold, or a third hardware resource alarm instruction issued by the second service board is acquired, and if it is determined that a hardware layer of the third service board currently has an idle second hardware resource, allocate the idle second hardware resource at the hardware layer of the third service board to a second virtual machine or the first virtual machine running on the intra-board Hypervisor in the second service board, where the third hardware resource alarm instruction is issued by the second service board after the current hardware resource usage of the hardware layer of the second service board exceeds the first threshold; and acquire a third virtual machine context that is issued by the third service board and that corresponds to a second interrupt, where the third virtual machine context is issued by the third service board after the third service board determines that the second hardware resource generating the second interrupt at the hardware layer of the third service board is an allocated hardware resource in response to the second interrupt generated at the hardware layer of the third service board, issue the third virtual machine context, or a fourth virtual machine context that is obtained based on the third virtual machine context and that corresponds to the second interrupt, so that the second service board, after acquiring the third virtual machine context or the fourth virtual machine context, transfers the acquired third virtual machine context or fourth virtual machine context to the second virtual machine or the first virtual machine running on the intra-board Hypervisor in the second service board for processing.

In addition, in a fifth aspect, a communication device provided in the present disclosure includes a first service board and a second service board, where each of the first service board and the second service board includes a hardware layer, an intra-board Hypervisor running on the hardware layer, and at least one virtual machine running on the intra-board Hypervisor;

where, the intra-board Hypervisor in the first service board is configured to receive a first interrupt generated at the hardware layer of the first service board, and to issue a first virtual machine context corresponding to the first interrupt if it is determined that the hardware resource generating the first interrupt at the hardware layer of the first service board is an allocated first hardware resource; and the intra-board Hypervisor in the second service board is configured to acquire the issued first virtual machine context, or a second virtual machine context that is obtained based on the first virtual machine context and that corresponds to the first interrupt, and to transfer the first virtual machine context or the second virtual machine context to the first virtual machine running on the intra-board Hypervisor in the second service board for processing, where the first virtual machine is the employer of the first hardware resource.

With reference to the fifth aspect, in a first feasible implementation manner, the intra-board Hypervisor in the first service board is specifically configured to receive a first interrupt generated at the hardware layer of the first service board, and to issue a first virtual machine context corresponding to the first interrupt to a shared memory if it is determined that the hardware resource generating the first interrupt at the hardware layer of the first service board is an allocated first hardware resource; and the intra-board Hypervisor in the second service board is specifically configured to acquire the first virtual machine context from the shared memory, or acquire a second virtual machine context that is obtained based on the first virtual machine context acquired from the shared memory and that corresponds to the first interrupt; after determining that the employer of the first hardware resource is the first virtual machine, and further determining according to the determined employer of the first hardware resource that the second virtual machine context is to be issued to the second service board, to transfer the second virtual machine context to a first virtual machine running on the intra-board Hypervisor in the second service board for processing;

or, the communication device further includes a control board, which includes a hardware layer and an inter-board Hypervisor running on the hardware layer, where:

the intra-board Hypervisor in the first service board is specifically configured to receive a first interrupt generated at the hardware layer of the first service board, and to issue a first virtual machine context corresponding to the first interrupt to a shared memory if it is determined that the hardware resource generating the first interrupt at the hardware layer of the first service board is an allocated first hardware resource;

the inter-board Hypervisor is configured to acquire a first virtual machine context corresponding to the first interrupt from the shared memory, and, after determining that the employer of the first hardware resource is the first virtual machine, and further determining according to the determined employer of the first hardware resource that a virtual machine context is to be issued to the second service board, to issue the first virtual machine context, or a second virtual machine context that is obtained based on the first virtual machine context and that corresponds to the first interrupt, to the intra-board Hypervisor in the second service board; and the intra-board Hypervisor in the second service board is specifically configured to receive the first virtual machine context or the second virtual machine context issued by the inter-board Hypervisor, and to transfer the received first virtual machine context or second virtual machine context to a first virtual machine running on the intra-board Hypervisor in the second service board for processing;

or, the communication device further includes a control board, which includes a hardware layer and an inter-board Hypervisor running on the hardware layer, where:

the intra-board Hypervisor in the first service board is specifically configured to issue a first virtual machine context corresponding to the first interrupt to the inter-board Hypervisor;

the inter-board Hypervisor is configured to acquire the first virtual machine context issued by the intra-board Hypervisor in the first service board, and, after determining that the employer of the first hardware resource is the first virtual machine, and further determining according to the determined employer of the first hardware resource that a virtual machine context is to be issued to the second service board, to issue the first virtual machine context, or a second virtual machine context that is obtained based on the first virtual machine context and that corresponds to the first interrupt, to the intra-board Hypervisor in the second service board; and the intra-board Hypervisor in the second service board is specifically configured to receive the first virtual machine context or the second virtual machine context issued by the inter-board Hypervisor, and to transfer the first virtual machine context or the second virtual machine context to the first virtual machine running on the intra-board Hypervisor in the second service board for processing;

or, the communication device further includes a control board, which includes a hardware layer and an inter-board Hypervisor running on the hardware layer, where:

the intra-board Hypervisor in the first service board is specifically configured to issue a first virtual machine context corresponding to the first interrupt to the inter-board Hypervisor;

the inter-board Hypervisor is configured to acquire the first virtual machine context issued by the intra-board Hypervisor in the first service board, and to issue the first virtual machine context, or a second virtual machine context that is obtained based on the first virtual machine context and that corresponds to the first interrupt, to a shared memory; and the intra-board Hypervisor in the second service board is specifically configured to acquire the first virtual machine context or the second virtual machine context from the shared memory, and, after determining that the employer of the first hardware resource is the first virtual machine, and further determining according to the determined employer of the first hardware resource that a virtual machine context is to be issued to the second service board, to transfer the first virtual machine context or the second virtual machine context to the first virtual machine running on the intra-board Hypervisor in the second service board for processing.

With reference to the fifth aspect, in a second feasible implementation manner, the communication device further includes a control board, which includes a hardware layer and an inter-board Hypervisor running on the hardware layer, where:

the inter-board Hypervisor is configured to: before the intra-board Hypervisor in the first service board issues a first virtual machine context corresponding to the first interrupt, if it is detected that the current hardware resource usage of the hardware layer of the second service board exceeds a first threshold, or a first hardware resource alarm instruction issued by the second service board is acquired, and if it is determined that the current hardware resource usage of the hardware layer of the first service board is lower than a second threshold, instruct the first service board to migrate resources to free a first hardware resource at the hardware layer of the first service board, and to allocate the freed first hardware resource at the hardware layer of the first service board, to a first virtual machine running on the intra-board Hypervisor in the second service board, where the first hardware resource alarm instruction is issued by the second service board after the current hardware resource usage of the hardware layer of the second service board exceeds the first threshold, which is higher than, lower than, or equal to the second threshold;

or, the inter-board Hypervisor is configured to: before the intra-board Hypervisor in the first service board issues a first virtual machine context corresponding to the first interrupt, if it is detected that the current hardware resource usage of the hardware layer of the second service board exceeds a first threshold, or a first hardware resource alarm instruction issued by the second service board is acquired, and if it is determined that the hardware layer of the first service board currently has an idle first hardware resource, allocate the idle first hardware resource at the hardware layer of the first service board, to a first virtual machine running on the intra-board Hypervisor in the second service board, where the first hardware resource alarm instruction is issued by the second service board after the current hardware resource usage of the hardware layer of the second service board exceeds the first threshold, which is higher than, lower than, or equal to the second threshold.

With reference to the second feasible implementation manner of the fifth aspect, in a third feasible implementation manner, the inter-board Hypervisor is further configured to: after the intra-board Hypervisor in the first service board issues a first virtual machine context corresponding to the first interrupt, if it is detected that the current hardware resource usage of the hardware layer of the first service board exceeds the first threshold, or if a second hardware resource alarm instruction issued by the first service board is acquired, re-allocate the allocated first hardware resource at the hardware layer of the first service board to a virtual machine running on the intra-board Hypervisor in the first service board, where the second hardware resource alarm instruction is issued by the first service board after the current hardware resource usage of the hardware layer of the first service board exceeds the first threshold.

With reference to the second feasible implementation manner of the fifth aspect or the third feasible implementation manner of the fifth aspect, in a fourth feasible implementation manner, the communication device is further deployed with a third service board, where the third service board includes a hardware layer, an intra-board Hypervisor running on the hardware layer, and at least one virtual machine running on the intra-board Hypervisor, where:

the inter-board Hypervisor is further configured to: if it is detected that the current hardware resource usage of the hardware layer of the second service board exceeds the first threshold, or a third hardware resource alarm instruction issued by the second service board is acquired, and if it is determined that the current hardware resource usage of a hardware layer of the third service board is lower than the second threshold, instruct the third service board to migrate resources to free a second hardware resource at the hardware layer of the third service board, and allocate the freed second hardware resource at the hardware layer of the third service board to a second virtual machine or the first virtual machine running on the intra-board Hypervisor in the second service board, where the third hardware resource alarm instruction is issued by the second service board after the current hardware resource usage of the hardware layer of the second service board exceeds the first threshold;

the intra-board Hypervisor in the third service board is configured to issue a third virtual machine context corresponding to a second interrupt, if the third service board receives the second interrupt generated at the hardware layer of the third service board and determines that the hardware resource generating the second interrupt at the hardware layer of the third service board is the allocated second hardware resource; and the intra-board Hypervisor in the second service board is further configured to acquire the issued third virtual machine context, or a fourth virtual machine context that is obtained based on the third virtual machine context and that corresponds to the second interrupt, and to transfer the acquired third virtual machine context or fourth virtual machine context to the second virtual machine or the first virtual machine running on the intra-board Hypervisor in the second service board for processing;

or, the inter-board Hypervisor is further configured to: if it is detected that the current hardware resource usage of the hardware layer of the second service board exceeds the first threshold, or a third hardware resource alarm instruction issued by the second service board is acquired, and if it is determined that a hardware layer of the third service board currently has an idle second hardware resource, allocate the idle second hardware resource at the hardware layer of the third service board to a second virtual machine or the first virtual machine running on the intra-board Hypervisor in the second service board, where the third hardware resource alarm instruction is issued by the second service board after the current hardware resource usage of the hardware layer of the second service board exceeds the first threshold;

the intra-board Hypervisor in the third service board is configured to issue a third virtual machine context corresponding to a second interrupt, if the third service board receives the second interrupt generated at the hardware layer of the third service board and determines that the hardware resource generating the second interrupt at the hardware layer of the third service board is the allocated second hardware resource; and the intra-board Hypervisor in the second service board is further configured to acquire the issued third virtual machine context, or a fourth virtual machine context that is obtained based on the third virtual machine context and that corresponds to the second interrupt, and to transfer the acquired third virtual machine context or fourth virtual machine context to the second virtual machine or the first virtual machine running on the intra-board Hypervisor in the second service board for processing.

With reference to the second feasible implementation manner of the fifth aspect, the third feasible implementation manner of the fifth aspect, or the fourth feasible implementation manner of the fifth aspect, in a fifth feasible implementation manner, the control board further includes an intra-board Hypervisor running on the hardware layer of the control board, and at least one virtual machine running on the intra-board Hypervisor, where:

the inter-board Hypervisor is further configured to: if it is detected that the current hardware resource usage of the hardware layer of the second service board exceeds the first threshold, or a fourth hardware resource alarm instruction issued by the second service board is acquired, and if it is determined that the current hardware resource usage of the hardware layer of the control board is lower than the second threshold, instruct the intra-board Hypervisor in the control board to migrate resources to free a third hardware resource at the hardware layer of the control board, and allocate the freed third hardware resource at the hardware layer of the control board to a second virtual machine or a fifth virtual machine or the first virtual machine running on the intra-board Hypervisor in the second service board;

the intra-board Hypervisor in the control board is further configured to issue a fifth virtual machine context corresponding to a third interrupt, if the control board receives the third interrupt generated at the hardware layer of the control board and determines that the hardware resource generating the third interrupt at the hardware layer of the control board is the allocated third hardware resource; and the intra-board Hypervisor in the second service board is further configured to acquire the issued fifth virtual machine context, or a sixth virtual machine context that is obtained based on the fifth virtual machine context, and to transfer the acquired fifth virtual machine context or sixth virtual machine context to the second virtual machine or the first virtual machine or the fifth virtual machine running on the intra-board Hypervisor in the second service board for processing;

or, the inter-board Hypervisor is further configured to: if it is detected that the current hardware resource usage of the hardware layer of the second service board exceeds a first threshold, or a fourth hardware resource alarm instruction issued by the second service board is acquired, and if it is determined that the hardware layer of the control board currently has an idle third hardware resource, allocate the idle third hardware resource at the hardware layer of the control board to a second virtual machine or the first virtual machine or a fifth virtual machine running on the intra-board Hypervisor in the second service board, where the fourth hardware resource alarm instruction is issued by the second service board after the current hardware resource usage of the hardware layer of the second service board exceeds the first threshold;

the intra-board Hypervisor in the control board is further configured to issue a fifth virtual machine context corresponding to a third interrupt, if the control board receives the third interrupt generated at the hardware layer of the control board and determines that the hardware resource generating the third interrupt at the hardware layer of the control board is the allocated third hardware resource; and the intra-board Hypervisor in the second service board is further configured to acquire the issued fifth virtual machine context, or a sixth virtual machine context that is obtained based on the fifth virtual machine context, and to transfer the acquired fifth virtual machine context or sixth virtual machine context to the second virtual machine or the first virtual machine or the fifth virtual machine running on the intra-board Hypervisor in the second service board for processing.

Based on the above, it can be seen that, in some embodiments of the present disclosure, a control board deployed in a communication device acquires a first virtual machine context that is issued by a first service board deployed in the communication device and that corresponds to a first interrupt, and issues the first virtual machine context corresponding to the first interrupt or a second virtual machine context corresponding to the first interrupt, so that a second service board deployed in the communication device, after acquiring the issued virtual machine context corresponding to the first interrupt, transfers the acquired virtual machine context corresponding to the first interrupt to a first virtual machine running on the intra-board Hypervisor in the second service board for processing, where the first virtual machine context corresponding to the first interrupt is issued by the first service board after the first service board determines that a first hardware resource generating the first interrupt at a hardware layer of the first service board is an allocated hardware resource in response to the first interrupt generated at the hardware layer of the first service board, in which the employer of the first hardware resource is the first virtual machine. On a communication device in an embodiment of the present disclosure, part of resources at a hardware layer of a service board may be allocated to a VM running on another service board. With a control board transferring a context of an interrupt, a service board completes the processing of the context of the interrupt. This method helps achieve cross-board sharing of hardware resources of service boards, further optimize the utilization of hardware resources of a communication device, and further boost the processing performance of a communication device.

BRIEF DESCRIPTION OF THE DRAWINGS

To illustrate the technical solutions in the embodiments of the present disclosure or in the prior art more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

FIG. 1 is a schematic structural diagram of a communication device in the prior art;

FIG. 2-a is a schematic structural diagram of a communication device according to an embodiment of the present disclosure;

FIG. 2-b is a schematic structural diagram of another communication device according to an embodiment of the present disclosure;

FIG. 2-c is a schematic structural diagram of another communication device according to an embodiment of the present disclosure;

FIG. 2-d is a schematic structural diagram of another communication device according to an embodiment of the present disclosure;

FIG. 3 is a schematic flowchart of a virtualization management method for hardware resources of a communication device according to an embodiment of the present disclosure;

FIG. 4 is a schematic flowchart of another virtualization management method for hardware resources of a communication device according to an embodiment of the present disclosure;

FIG. 5-a is a schematic structural diagram of another communication device according to an embodiment of the present disclosure;

FIG. 5-b is a schematic flowchart of another virtualization management method for hardware resources of a communication device according to an embodiment of the present disclosure;

FIG. 6-a is a schematic structural diagram of a communication device according to an embodiment of the present disclosure;

FIG. 6-b is a schematic structural diagram of another communication device according to an embodiment of the present disclosure;

FIG. 6-c is a schematic diagram of an inter-board Hypervisor according to an embodiment of the present disclosure;

FIG. 7-a is a schematic structural diagram of another communication device according to an embodiment of the present disclosure;

FIG. 7-b is a schematic structural diagram of another communication device according to an embodiment of the present disclosure;

FIG. 7-c is a schematic structural diagram of another communication device according to an embodiment of the present disclosure;

FIG. 7-*d* is a schematic structural diagram of another communication device according to an embodiment of the present disclosure;

FIG. 7-*e* is a schematic structural diagram of another communication device according to an embodiment of the present disclosure;

FIG. 8-*a* is a schematic diagram of a control board in a communication device according to an embodiment of the present disclosure;

FIG. 8-*b* is a schematic diagram of a control board in another communication device according to an embodiment of the present disclosure; and FIG. 8-*c* is a schematic diagram of a control board in another communication device according to an embodiment of the present disclosure.

DESCRIPTION OF EMBODIMENTS

Embodiments of the present disclosure provide a virtualization management method and related apparatuses for managing hardware resources of a communication device to optimize the utilization of hardware resources of the communication device and further boost performance.

To make the solutions of the present disclosure more comprehensible for a person skilled in the art, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Terms such as "a first", "a second", "a third", and "a fourth" (if any) in the summary, claims, and foregoing accompanying drawings of the present disclosure are used to distinguish between similar objects, and are not necessarily used to describe a specific sequence or order. It should be understood that the terms so used are interchangeable under appropriate circumstances, so that the embodiments of the present disclosure described herein are, for example, capable of being implemented in sequences other than the sequences illustrated or described herein. Furthermore, the terms "include" and "have" and any variations thereof, are intended to cover a non-exclusive inclusion. For example, a process, a method, a system, a product, or a device that includes a series of steps or units, is not necessarily limited to expressly listed steps or units, but may include other steps or units that are not expressly listed or that are inherent to such process, method, product, or device.

In order to help understand embodiments of the present disclosure, several terms that will be introduced in the description of the embodiments of the present disclosure are defined herein first.

VM (VM):

One or more virtual computers may be simulated on a physical computer using the VM software, and these VMs work like real computers. A VM can have an operating system and application programs installed, and can access network resources. The applications that run on a VM work as on a physical computer.

Hardware Layer:

A hardware layer is a hardware platform running in a virtual environment, where a hardware layer may include a plurality of hardware. For example, a hardware layer of a communication device or a computing board may include a processor (such as a CPU) and a memory, and may further include an input/output device such as a network adapter and a disk.

Hypervisor (Hypervisor):

As a management layer, a Hypervisor is configured to complete management and allocation for hardware resources, to present a virtual hardware platform for a VM, and to implement VM scheduling and isolation, where a virtual hardware platform provides various hardware resources for each VM running thereon, for example, a virtual CPU, a memory, a virtual disk, and a virtual network adapter. A VM runs on a virtual hardware platform, and one or more VMs run on a Hypervisor.

The following describes the architecture of several communication devices that are capable of implementing solutions in embodiments of the present disclosure.

FIG. 2-*a* to FIG. 2-*d*. FIG. 2-*a* to FIG. 2-*d* are schematic structural diagrams of several communication devices according to embodiments of the present disclosure. The communication device illustrated in FIG. 2-*a* includes a plurality of service boards. Each service board may include a hardware layer, an intra-board Hypervisor running on the hardware layer, and at least one VM running on the intra-board Hypervisor. The hardware layer may include a CPU, a memory, a network adapter, and so on. The intra-board Hypervisors of the service boards are capable of communicating with each other. Compared with the communication device illustrated in FIG. 2-*a*, the communication device illustrated in FIG. 2-*b* has an additional shared memory. The intra-board Hypervisors of the service boards in the communication device illustrated in FIG. 2-*b* are capable of accessing the shared memory, and are further capable of communicating with each other through the shared memory. For example, part of a memory of a service board may be used as a shared memory for all service boards, or a standalone memory may be deployed as a shared memory for all service boards.

The communication device illustrated in FIG. 2-*c* includes a plurality of service boards and a control board. In embodiments of the present disclosure, a board deployed with an inter-board Hypervisor on a communication device is called a control board. An inter-board Hypervisor runs on a hardware layer of a control board in a communication device. Of course, a control board can still have service processing capabilities similar to those of a service board. A service board may include a hardware layer, an intra-board Hypervisor running on the hardware layer, and at least one VM running on the intra-board Hypervisor. A hardware layer of a control board or a service board may include a CPU, a memory, a network adapter, and so on. The inter-board Hypervisor and the intra-board Hypervisor in each service board are capable of communicating with each other. Compared with the communication device illustrated in FIG. 2-*c*, the communication device illustrated in FIG. 2-*d* has an additional shared memory. On the communication device illustrated in FIG. 2-*d*, the intra-board Hypervisor in each service board and the inter-board Hypervisor are capable of accessing the shared memory, and are further capable of communicating with each other through the shared memory. For example, part of a memory of a control board or a service board may be used as a shared memory for all service boards, or a standalone memory may be deployed as a shared memory for all service boards.

Solutions in embodiments of the present disclosure may be specifically implemented based on, for example, a communication device whose architecture is illustrated in FIG.

2-*a*, FIG. 2-*b*, FIG. 2-*c*, or FIG. 2-*d*, and of course, based on a communication device with a variation of the architecture.

A virtualization management method for managing hardware resources of a communication device provided in an embodiment of the present disclosure, may include: acquiring a first VM context that is issued by a first service board deployed in a communication device and that corresponds to a first interrupt, where the first VM context corresponding to the first interrupt is issued by the first service board after the first service board determines that a first hardware resource generating the first interrupt at a hardware layer of the first service board is an allocated hardware resource in response to the first interrupt generated at the hardware layer of the first service board; issuing the first VM context, or a second VM context that is obtained based on the first VM context and that corresponds to the first interrupt, so that a second service board deployed in the communication device, after acquiring the issued first VM context or second VM context, transfers the acquired first VM context or second VM context to a first VM running on the intra-board Hypervisor in the second service board for processing, where the first VM is the employer of the first hardware resource.

Referring to FIG. 3, a virtualization management method for managing hardware resources of a communication device according to an embodiment of the present disclosure may include:

301: A control board deployed in a communication device acquires a first VM context that is issued by a first service board deployed in the communication device and that corresponds to a first interrupt.

The first VM context corresponding to the first interrupt may be issued by the first service board after the first service board determines that a first hardware resource generating the first interrupt at a hardware layer of the first service board is an allocated hardware resource in response to the first interrupt generated at the hardware layer of the first service board.

For example, the inter-board Hypervisor in a control board may be used to acquire a first VM context that is issued by the intra-board Hypervisor in a first service board and that corresponds to a first interrupt, where the first VM context corresponding to the first interrupt is issued after the intra-board Hypervisor in the first service board receives the first interrupt generated at the hardware layer of the first service board and determines that the first hardware resource generating the first interrupt at the hardware layer of the first service board is an allocated hardware resource. Here, a VM context corresponding to an interrupt in the embodiments of the present disclosure may include the context of the interrupt (for example, a VM context corresponding to a first interrupt includes the context of the first interrupt), and of course, may further include other information originally contained in the VM context corresponding to the interrupt, and other information may further be added to the VM context corresponding to the interrupt as needed.

In some embodiments of the present disclosure, the intra-board Hypervisor in a first service board in a communication device, after receiving a first interrupt generated at the hardware layer of the first service board, may first check whether the first hardware resource generating the first interrupt at the hardware layer of the first service board is an allocated hardware resource (that is, partial resources (for example, a physical Core or a virtual Core) at the hardware layer of the first service board may be allocated (equivalent to, lent) to a VM running on the intra-board Hypervisor in another service board in the communication device based on needs). If the intra-board Hypervisor in the first service board determines that the first hardware resource generating the first interrupt at the hardware layer of the first service board is not an allocated hardware resource (that is, the first hardware resource generating the first interrupt at the hardware layer of the first service board is being used by a VM running on the intra-board Hypervisor in the first service board, where the employer of the first hardware resource is the VM running on the intra-board Hypervisor in the first service board), the intra-board Hypervisor in the first service board sends a first VM context corresponding to the first interrupt to a VM running on the intra-board Hypervisor, so that the VM is capable of processing the first VM context corresponding to the first interrupt. If the intra-board Hypervisor in the first service board determines that the first hardware resource generating the first interrupt at the hardware layer of the first service board is an allocated hardware resource (that is, the first hardware resource generating the first interrupt at the hardware layer of the first service board is not being used by a VM running on the intra-board Hypervisor in the first service board), the intra-board Hypervisor in the first service board sends the first VM context corresponding to the first interrupt.

The intra-board Hypervisor in the first service board may send the first VM context corresponding to the first interrupt in many ways. For example, the intra-board Hypervisor in the first service board may send the first VM context corresponding to the first interrupt to the inter-board Hypervisor in a control board, in which scenario, the inter-board Hypervisor in the control board is capable of receiving the first VM context that is issued by the intra-board Hypervisor in the first service board and that corresponds to the first interrupt. Or, the intra-board Hypervisor in the first service board may send the first VM context corresponding to the first interrupt to a shared memory (if any), in which scenario, the inter-board Hypervisor in a control board is capable of acquiring the first VM context that is issued by the intra-board Hypervisor in the first service board and that corresponds to the first interrupt from the shared memory. Or, the intra-board Hypervisor in the first service board may issue the first VM context corresponding to the first interrupt in a broadcasting way, in which scenario, the inter-board Hypervisor in a control board is capable of receiving the first VM context issued by the intra-board Hypervisor in the first service board in a broadcasting way.

The first VM context that is issued by the intra-board Hypervisor in the first service board and that corresponds to the first interrupt may carry an employee identifier, which indicates the first hardware resource generating the first interrupt. For example, if a physical Core or a virtual Core at the hardware layer of the first service board generates the first interrupt, the employee information carried in the first VM context corresponding to the first interrupt may be, for example, the identification information of the physical Core or virtual Core. Of course, the first VM context that is issued by the intra-board Hypervisor in the first service board and that corresponds to the first interrupt may further carry employer information, which may indicate a VM on the communication device that is allocated the hardware resource generating the first interrupt. For example, if the first hardware resource generating the first interrupt at the hardware layer of the first service board is allocated to a VM running on the intra-board Hypervisor in a second service board (that is, the VM running on the intra-board Hypervisor in the second service board is allocated the first hardware resource generating the first interrupt at the hardware layer of the first service board), the employer information carried in the first VM context corresponding to the first interrupt may be, for example, the identification information of the intra-board Hypervisor in the second service board, or the identification information of a first VM that runs on the intra-board Hypervisor in the second service board and that uses the first hardware resource generating the first interrupt, where the employer of the first hardware resource is the first VM. Of course, if the first VM context that is issued by the intra-board Hypervisor in the first service board and that corresponds to the first interrupt does not carry the corresponding employer information, the inter-board Hypervisor in a control board searches, according to the hardware resource configuration relationship, for a first VM that is allocated the first hardware resource generating the first interrupt (the first VM is the employer of the first hardware resource generating the first interrupt, where it is assumed that the first VM runs on the intra-board Hypervisor in the second service board) to know that the employer of the first hardware resource is the first VM, and the inter-board Hypervisor in the control board may further add the employer information of the first hardware resource (for example, the identifier of the first VM) to the first VM context corresponding to the first interrupt to obtain a to-be-issued second VM context corresponding to the first interrupt.

302: The control board issues the first VM context, or a second VM context that is obtained based on the first VM context and that corresponds to the first interrupt, so that a second service board deployed in the communication device, after acquiring the issued first VM context or second VM context, transfers the first VM context or the second VM context to a first VM running on the intra-board Hypervisor in the second service board for processing, where the employer of the first hardware resource is the first VM.

In some embodiments of the present disclosure, if the first VM context corresponding to the first interrupt does not carry the employer identifier of the first hardware resource, the control board may add the employer identifier of the first hardware resource to the first VM context to obtain a second VM context corresponding to the first interrupt, where the first VM context is different from the second VM context. Or, if the first VM context corresponding to the first interrupt carries the employer identifier of the first hardware resource, the control board may remove the employer identifier of the first hardware resource carried in the first VM context to obtain a second VM context corresponding to the first interrupt, where the first VM context is different from the second VM context. Or, the control board may also add other information to the first VM context and/or remove other information carried in the first VM context, and/or perform format conversion for the first VM context, to obtain a second VM context that is different from the first VM context.

For example, the inter-board Hypervisor in the control board may be used to issue the first VM context, or a second VM context that is obtained based on the first VM context and that corresponds to the first interrupt, so that the intra-board Hypervisor in a second service board, after acquiring the first VM context or the second VM context issued by the inter-board Hypervisor in the control board, is capable of sending the first VM context or the second VM context to a first VM running on the intra-board Hypervisor in the second service board for processing.

In some embodiments of the present disclosure, the inter-board Hypervisor, after acquiring a first VM context that is issued by the intra-board Hypervisor in a first service board and that corresponds to a first interrupt, for example, may issue the first VM context or a second VM context that is obtained based on the first VM context and that corresponds to the first interrupt in many ways. The first VM context or the second VM context issued by the inter-board Hypervisor, for example, may carry an employer identifier of a first hardware resource. Of course, the intra-board Hypervisor in a second service board is capable of acquiring the first VM context or the second VM context issued by the inter-board Hypervisor. For example, the inter-board Hypervisor may issue the first VM context or a second VM context that is obtained based on the first VM context and that corresponds to the first interrupt in a broadcasting way, in which scenario, the intra-board Hypervisor in the second service board is capable of receiving the first VM context or the second VM context issued by the inter-board Hypervisor. Because the employer of the first hardware resource is the first VM running on the intra-board Hypervisor in the second service board, the intra-board Hypervisor in the second service board is capable of determining that the employer of the first hardware resource is the first VM, and according to the employer of the first hardware resource, determines that a VM context is to be issued to the second service board. After determining according to the employer of the first hardware resource that a VM context is to be issued to the second board, the intra-board Hypervisor in the second service board may transfer the acquired first VM context or second VM context to the first VM running on the intra-board Hypervisor in the second service board for processing. Or, the inter-board Hypervisor may, after determining that the employer of the first hardware resource is the first VM, and further determining according to the employer of the first hardware resource that a VM context is to be issued to the second service board, issue the first VM context, or a second VM context that is obtained based on the first VM context and that corresponds to the first interrupt, to the intra-board Hypervisor in the second service board, in which scenario, the intra-board Hypervisor in the second service board is capable of receiving the first VM context or the second VM context issued by the inter-board Hypervisor. Or, the inter-board Hypervisor may write the first VM context or a second VM context that is obtained based on the first VM context and that corresponds to the first interrupt, to a shared memory (if any), in which scenario, the intra-board Hypervisor in the second service board is capable of acquiring the first VM context or the second VM context issued by the inter-board Hypervisor from the shared memory. The intra-board Hypervisor in the second service board may, after determining that the employer of the first hardware resource is the first VM, and further determining according to the employer of the first hardware resource that a VM context is to be issued to the second service board, transfer the acquired first VM context or second VM context to a first VM running on the intra-board Hypervisor in the second service board for processing. For other scenarios, and the rest may be deduced by analogy.

Further, after a VM running on the intra-board Hypervisor in the second service board processes the first VM context or the second VM context, the intra-board Hypervisor in the second service board may issue a second VM processing context corresponding to the first interrupt. After acquiring the second VM processing context that is issued by the intra-board Hypervisor in the second service board and that corresponds to the first interrupt, the inter-board Hypervisor may issue the second VM processing context or a first VM processing context that is obtained based on the second VM processing context and that corresponds to the first interrupt. The intra-board Hypervisor in the first service board may acquire the second VM processing context or first VM processing context issued by the inter-board Hypervisor. For example, if the second VM processing context corresponding to the first interrupt does not carry the identifier (that is, employee identifier) of the first hardware resource, the control board may add the identifier of the first hardware resource to the second VM processing context to obtain a first VM processing context corresponding to the first interrupt. Or, if the second VM processing context corresponding to the first interrupt carries the identifier of the first hardware resource, the control board may remove the identifier of the first hardware resource carried in the second VM processing context to obtain a first VM processing context corresponding to the first interrupt. Or, the control board may further add other information to the second VM processing context and/or remove other information carried in the second VM processing context, and/or perform format conversion for the second VM processing context, to obtain a first VM processing context that is different from the second VM processing context.

It can be understood that, the way in which the intra-board Hypervisor in the second service board issues the second VM processing context corresponding to the first interrupt, may be similar to the way in which the intra-board Hypervisor in the first service board issues the first VM context corresponding to the first interrupt, the way in which the inter-board Hypervisor issues the second VM processing context or first VM processing context, or the way in which the inter-board Hypervisor issues the second VM context or first VM context, and details are not provided herein again. In the embodiments of the present disclosure, a VM processing context corresponding to an interrupt may include the processing context of the interrupt (for example, a VM processing context corresponding to a first interrupt includes the processing context of the first interrupt), and of course, may further include other information originally contained in the VM processing context corresponding to the interrupt, and other information may further be added to the VM context corresponding to the interrupt as needed.

Based on the above, it can be seen that, in this embodiment, a control board deployed in a communication device acquires a first VM context that is issued by a first service board deployed in the communication device and that corresponds to a first interrupt, and issues the first VM context corresponding to the first interrupt or a second VM context that is obtained based on the first VM context and that corresponds to the first interrupt, so that a second service board deployed in the communication device, after acquiring the issued first VM context or second VM context, transfers the acquired first VM context or second VM context to a first VM running on the intra-board Hypervisor in the second service board for processing, where the first VM context corresponding to the first interrupt is issued by the first service board after the first service board determines that the first hardware resource generating the first interrupt at the hardware layer of the first service board is an allocated hardware resource in response to the first interrupt generated at the hardware layer of the first service board, in which the employer of the first hardware resource is the first VM. On a communication device in this embodiment, part of resources at a hardware layer of a service board may be allocated to a VM running on another service board. With a control board transferring the context of an interrupt, a service board completes the processing of the context of the interrupt. This method helps achieve cross-board sharing of hardware resources of service boards, further optimize the utilization of hardware resources of a communication device, and further boost the processing performance of a communication device.

In some embodiments of the present disclosure, the inter-board Hypervisor in a control board may further maintain the resource pool status information (for example, maintaining the resource pool status information in the status table of a resource pool), where the inter-board Hypervisor may maintain the resource pool status information in a shared memory (if any). The resource pool status information may indicate the usage status of a hardware resource at hardware layers of a plurality of service boards in a communication device, for example, the current usage of a hardware resource at the hardware layer of each service board, and the employer of a hardware resource at the hardware layer of each service board (for example, indicating which hardware resource at the hardware layer of each service board is allocated to a VM running on the intra-board Hypervisor in another service board, and which resource is not allocated). In addition, the inter-board Hypervisor in the control board may further periodically and/or non-periodically acquire the hardware resource usage of the hardware layer of each service board to update the resource pool status information maintained by itself, and to ensure that the resource pool status information maintained by itself indicates the latest hardware resource usage status of the hardware layer of each service board.

In some embodiments of the present disclosure, the inter-board Hypervisor in a control board may be utilized to achieve dynamic allocation or recovery of hardware resources.

For example, if a control board (for example, the inter-board Hypervisor in the control board), before acquiring a first VM context that is issued by a first service board deployed in the communication device and that corresponds to a first interrupt, detects that the current hardware resource usage of a hardware layer of a second service board exceeds a first threshold (or acquires a first hardware resource alarm instruction issued by the second service board, where the first hardware resource alarm instruction is issued by the second service board, for example, after the current hardware resource usage of the hardware layer of the second service board exceeds the first threshold or another threshold), and if the control board determines that the current hardware resource usage of the hardware layer of the first service board is lower than a second threshold, the control board may instruct the first service board to migrate resources to free a first hardware resource at the hardware layer of the first service board, and, allocate the freed first hardware resource at the hardware layer of the first service board, to a first VM running on the intra-board Hypervisor in the second service board, where the first threshold is higher than, lower than, or equal to the second threshold. For another example, if a control board, before acquiring a first VM context that is issued by a first service board deployed in the communication device and that corresponds to a first interrupt, detects that the current hardware resource usage of a hardware layer of a second service board exceeds a first threshold (or acquires a first hardware resource alarm instruction issued by the second service board, where the first hardware resource alarm instruction is issued by the second service board, for example, after the current hardware resource usage of the hardware layer of the second service board exceeds the first threshold or another threshold), and if the control board determines that the hardware layer of the first service board currently has an idle first hardware resource, the control board may allocate the idle first hardware resource at the hardware layer of the first service board, to a first VM running on the intra-board Hypervisor in the second service board. Of course, the control board may also allocate the idle first hardware resource (or other more hardware resources) at the hardware layer of the first service board to the first VM or another VM running on the intra-board Hypervisor in the second service board, using a static configuration method or another allocation method.

Still, for another example, if a control board (for example, the inter-board Hypervisor or another unit in the control board), after issuing a first VM context or a second VM context corresponding to a first interrupt, acquires a second hardware resource alarm instruction issued by the intra-board Hypervisor in a first service board (or another service board), where the intra-board Hypervisor in the first service board (or another service board) may issue a hardware resource alarm instruction when the current hardware resource usage of the hardware layer of the first service board (or another service board) exceeds a first threshold (for example, 70%) or another threshold, the control board may also re-allocate part or all of an allocated hardware resource (for example, a first hardware resource) at the hardware layer of the first service board (or another service board), to a VM running on the intra-board Hypervisor in the first service board (or another service board) (equivalent to resource recovery). Of course, if a hardware layer of another service board in the communication device still has an idle hardware resource at this time, the control board may also allocate part or all of the idle hardware resource at the hardware layer of the another service board, to a VM running on the intra-board Hypervisor in the first service board (or another service board). Yet, for another example, when detecting that the hardware resource usage of a hardware layer of a first service board (or another service board) exceeds a first threshold, a control board may re-allocate part or all of an allocated hardware resource (for example, a first hardware resource) at the hardware layer of the first service board (or another service board), to a VM running on the intra-board Hypervisor in the first service board (or another service board). Still, for another example, if a control board detects that the hardware resource usage of a hardware layer of a first service board (or another service board) exceeds a first threshold, and if a hardware layer of another service board in the communication device has an idle hardware resource at this time, the control board may also, for example, allocate part or all of the idle hardware resource at the hardware layer of the another service board, to a VM running on the intra-board Hypervisor in the first service board (or another service board); and the rest may be deduced by analogy.

It can be seen that, based on the mechanism of foregoing examples, dynamic recovery or re-allocation of allocated hardware resources between service boards can be achieved.

For another example, it is assumed that a communication device is further deployed with a third service board, where the third service board includes a hardware layer, an intra-board Hypervisor running on the hardware layer, and at least one VM running on the intra-board Hypervisor. If a control board (for example, the inter-board Hypervisor or another unit in the control board) acquires a third hardware resource alarm instruction issued by the intra-board Hypervisor in a second service board (where the intra-board Hypervisor in the second service board may issue a hardware resource alarm instruction, for example, when the hardware resource usage of the hardware layer of the second service board exceeds a first threshold (for example, 70%) or another threshold), and if the control board determines that the current hardware resource usage of a hardware layer of the third service board is lower than a second threshold (for example, 50%) or another threshold, the control board may instruct the intra-board Hypervisor in the third service board to migrate resources to free part of hardware resources (for example, a second hardware resource, which is, for example, a physical Core or a virtual Core) at the hardware layer of the third service board, and, allocate part or all of the freed hardware resource (for example, a second hardware resource) at the hardware layer of the third service board, to a VM (for example, a second VM or a first VM) running on the intra-board Hypervisor in the second service board. Still, for another example, if a control board (for example, the inter-board Hypervisor or another unit in the control board) acquires a third hardware resource alarm instruction issued by the intra-board Hypervisor in a second service board (or if the control board detects that the hardware resource usage of the hardware layer of the second service board exceeds a first threshold or another threshold), and if the control board determines that a hardware layer of the third service board currently has idle hardware resources (for example, a second hardware resource), which are part or all of hardware resources of the third service board, the control board may allocate part or all of the idle hardware resources (for example, a second hardware resource) at the hardware layer of the third service board, to a VM (for example, a first VM or a second VM) running on the intra-board Hypervisor in the second service board. Yet, for another example, if a control board detects that the hardware resource usage of a hardware layer of a second service board exceeds a first threshold or another threshold (for example, when periodically or non-periodically checking the hardware resource usage of the hardware layer of each service board, the control board detects that the hardware resource usage of the hardware layer of the second service board exceeds a first threshold or another threshold), the control board may also first instruct the intra-board Hypervisor in a service board in the communication device, where the current hardware resource usage of the intra-board Hypervisor is lower than a second threshold or another threshold, to migrate resources to free part of hardware resources at the hardware layer of the service board, and then allocate part or all of the freed hardware resources at the hardware layer of the service board, to a VM (for example, a second VM or a first VM) running on the intra-board Hypervisor in the second service board.

For example, if a control board allocates a second hardware resource at a hardware layer of a third service board to a first VM or a second VM running on the intra-board Hypervisor in a second service board, and if the control board acquires a third VM context that is issued by the third service board and that corresponds to a second interrupt, where the third VM context corresponding to the second interrupt is issued by the third service board after the third service board determines that the second hardware resource generating the second interrupt at the hardware layer of the third service board is an allocated hardware resource in response to the second interrupt generated at the hardware layer of the third service board, the control board may issue the third VM context, or a fourth VM context that is obtained based on the third VM context and that corresponds to the second interrupt, so that the second service board, after acquiring the issued third VM context or fourth VM context, transfers the acquired third VM context or fourth VM context to a second VM or a first VM running on the intra-board Hypervisor in the second service board for processing, where the employer of the second hardware resource is the second VM or the first VM. It can be understood that, the way in which the third service board and the control board issue a VM context corresponding to the second interrupt, may be similar to the previously introduced way in which the first service board and the control board issue a VM context corresponding to the first interrupt, and that the way in which the second service board acquires the issued third VM context or fourth VM context corresponding to the second interrupt, may be similar to the previously introduced way in which the second service board acquires the issued second VM context corresponding to the first interrupt, and that the way in which the control board, based on the third VM context corresponding to the second interrupt, obtains the fourth VM context that is different from the third VM context and that corresponds to the second interrupt, may be similar to the previously introduced way in which the control board, based on the first VM context corresponding to the first interrupt, obtains the second VM context that is different from the first VM context and that corresponds to the first interrupt, and details are not provided herein again.

It can be seen that, based on the mechanism of foregoing examples, dynamic allocation of hardware resources between service boards can be achieved.

In some embodiments of the present disclosure, if the inter-board Hypervisor in a control board deployed in a communication device detects that the current hardware resource usage of a hardware layer of a second service board exceeds a first threshold (or acquires a fourth hardware resource alarm instruction issued by the second service board), and if the inter-board Hypervisor in the control board determines that the current hardware resource usage of the hardware layer of the control board is lower than a second threshold, the inter-board Hypervisor in the control board may instruct itself to migrate resources to free a third hardware resource at the hardware layer of the control board, and, allocate the freed third hardware resource at the hardware layer of the control board, to a second VM or a first VM or a fifth VM running on the intra-board Hypervisor in the second service board. For another example, if a control board detects that the current hardware resource usage of a hardware layer of a second service board exceeds a first threshold (or acquires a fourth hardware resource alarm instruction issued by the second service board), and if the control board determines that a hardware layer of the control board currently has an idle third hardware resource, the control board may allocate the idle third hardware resource at the hardware layer of the control board, to a second VM or a first VM or a fifth VM running on the intra-board Hypervisor in the second service board. Here, the intra-board Hypervisor in the second service board may issue a fourth hardware resource alarm instruction, for example, when the hardware resource usage of the hardware layer of the second service board exceeds a first threshold (for example, 70%) or another threshold.

For example, if a control board allocates a third hardware resource at a hardware layer of the control board to a first VM or a second VM or a fifth VM running on the intra-board Hypervisor in a second service board, and if the inter-board Hypervisor in the control board receives a third interrupt generated at the hardware layer of the control board and determines that the hardware resource generating the third interrupt at the hardware layer of the control board is the allocated third hardware resource, the control board may issue a fifth VM context corresponding to the third interrupt, where the employer of the third hardware resource is the first VM or the second VM or the fifth VM running on the intra-board Hypervisor in the second service board. The second service board acquires the issued fifth VM context, or a sixth VM context that is obtained based on the fifth VM context and that corresponds to the third interrupt, and transfers the acquired sixth VM context or fifth VM context to the second VM or the first VM or the fifth VM running on the intra-board Hypervisor in the second service board for processing.

In some embodiments of the present disclosure, if the inter-board Hypervisor in a control board deployed in a communication device detects that the current hardware resource usage of the hardware layer of the control board exceeds a first threshold or another threshold, and determines that the current hardware resource usage of a hardware layer of a third service board deployed in the communication device is lower than a second threshold or another threshold, the inter-board Hypervisor in the control board may instruct the intra-board Hypervisor in the third service board to migrate resources to free a fourth hardware resource at the hardware layer of the third service board, and, allocate the freed fourth hardware resource at the hardware layer of the third service board, to a third VM running on the intra-board Hypervisor in the control board. For another example, if the inter-board Hypervisor in a control board deployed in a communication device detects that the current hardware resource usage of a hardware layer of the control board exceeds a first threshold or another threshold, and determines that a hardware layer of a third service board currently has an idle fourth hardware resource, the inter-board Hypervisor in the control board may allocate the idle fourth hardware resource at the hardware layer of the third service board, to a third VM running on the intra-board Hypervisor in the control board.

For example, if a control board allocates a fourth hardware resource at a hardware layer of a third service board to a third VM running on the intra-board Hypervisor in the control board, and if the inter-board Hypervisor in the control board acquires a seventh VM context that is issued by the third service board and that corresponds to a fourth interrupt, where the seventh VM context corresponding to the fourth interrupt is issued by the third service board after the third service board determines that the fourth hardware resource generating the fourth interrupt at the hardware layer of the third service board is an allocated hardware resource in response to the fourth interrupt generated at the hardware layer of the third service board, the intra-board Hypervisor in the control board may acquire the seventh VM context corresponding to the fourth interrupt and transfer the acquired seventh VM context corresponding to the fourth interrupt to a third VM running on the intra-board Hypervisor in the control board for processing, where the employer of the fourth hardware resource is the third VM.

It can be understood that, the way in which each intra-board Hypervisor issues a hardware resource alarm instruction may be similar to the way in which an intra-board Hypervisor issues a VM context corresponding to an interrupt, and details are not provided herein again.

It should be noted that, in the solution description in the embodiment of the present disclosure, an operation performed by a service board, for example, may be specifically performed by the intra-board Hypervisor or another unit in the service board, an operation performed by the intra-board Hypervisor in a service board, of course, may also be performed by another unit in the service board, and an operation performed by a unit in a service board can be considered as an operation performed by the service board;

similarly, an operation performed by a control board, for example, may be specifically performed by the intra-board Hypervisor, inter-board Hypervisor, or another unit in the control board, an operation performed by the intra-board Hypervisor or inter-board Hypervisor in a control board, of course, may also be performed by another unit in the control board, and an operation performed by a unit in a control board can be considered as an operation performed by the control board.

It should be noted that, a communication device in the embodiment of the present disclosure may be, for example, an access network device such as a base station, an access point, or a base station controller, or a core network device such as a mobility management network element or a packet data network gateway, or another communication network element or device.

The following describes another embodiment of the present disclosure: a virtualization management method for managing hardware resources of a communication device. The method may include: receiving, by a first service board deployed in a communication device, a first interrupt generated at a hardware layer of the first service board; issuing a first VM context corresponding to the first interrupt, if it is determined that the hardware resource generating the first interrupt at the hardware layer of the first service board is an allocated first hardware resource; acquiring, by a second service board deployed in the communication device, the issued first VM context, or a second VM context that is obtained based on the first VM context and that corresponds to the first interrupt, and transferring the acquired first VM context or second VM context to a first VM running on the intra-board Hypervisor in the second service board for processing, where the first VM is the employer of the first hardware resource.

Referring to FIG. 4, a virtualization management method for managing hardware resources of a communication device according to an embodiment of the present disclosure may include:

401: A first service board deployed in a communication device receives a first interrupt generated at a hardware layer of the first service board, and if it is determined that the hardware resource generating the first interrupt at the hardware layer of the first service board is an allocated first hardware resource, issues a first VM context corresponding to the first interrupt.

For example, the intra-board Hypervisor (or another unit) in a first service board may be used to receive a first interrupt generated at the hardware layer of the first service board, and after determining that the first hardware resource generating the first interrupt at the hardware layer of the first service board is an allocated hardware resource, to issue a first VM context corresponding to the first interrupt.

In some embodiments of the present disclosure, the intra-board Hypervisor in a first service board in a communication device, after receiving a first interrupt generated at the hardware layer of the first service board, may first check whether the first hardware resource generating the first interrupt at the hardware layer of the first service board is an allocated hardware resource (partial resources (for example, a physical Core or a virtual Core) at the hardware layer of the first service board may be allocated (equivalent to, lent) to a VM running on the intra-board Hypervisor in another service board in the communication device based on needs). If the intra-board Hypervisor in the first service board determines that the first hardware resource generating the first interrupt at the hardware layer of the first service board is not an allocated hardware resource (that is, the first hardware resource generating the first interrupt at the hardware layer of the first service board is being used by a VM running on the intra-board Hypervisor in the first service board, where the employer of the first hardware resource is the VM running on the intra-board Hypervisor in the first service board), the intra-board Hypervisor in the first service board sends a first VM context corresponding to the first interrupt to a VM running on the intra-board Hypervisor, so that the VM is capable of processing the first VM context corresponding to the first interrupt. If the intra-board Hypervisor in the first service board determines that the first hardware resource generating the first interrupt at the hardware layer of the first service board is an allocated hardware resource (that is, the first hardware resource generating the first interrupt at the hardware layer of the first service board is not being used by a VM running on the intra-board Hypervisor in the first service board), the intra-board Hypervisor in the first service board sends the first VM context corresponding to the first interrupt.

The intra-board Hypervisor in the first service board may send the first VM context corresponding to the first interrupt in many ways. For example, the intra-board Hypervisor in the first service board may send the first VM context corresponding to the first interrupt to the inter-board Hypervisor in a control board, in which scenario, the inter-board Hypervisor in the control board is capable of receiving the first VM context that is issued by the intra-board Hypervisor in the first service board and that corresponds to the first interrupt. Or, the intra-board Hypervisor in the first service board may send the first VM context corresponding to the first interrupt to a shared memory (if any), in which scenario, the inter-board Hypervisor in a control board or the intra-board Hypervisor in another service board (for example, a second service board) is capable of acquiring the first VM context that is issued by the intra-board Hypervisor in the first service board and that corresponds to the first interrupt from the shared memory. Or, the intra-board Hypervisor in the first service board may issue the first VM context corresponding to the first interrupt in a broadcasting way, in which scenario, the inter-board Hypervisor in a control board or the intra-board Hypervisor in another service board (for example, a second service board) is capable of receiving the first VM context that is issued by the intra-board Hypervisor in the first service board in a broadcasting way and that corresponds to the first interrupt.

The first VM context that is issued by the intra-board Hypervisor in the first service board and that corresponds to the first interrupt may carry an employee identifier, which indicates the first hardware resource generating the first interrupt. For example, if a physical Core or a virtual Core at the hardware layer of the first service board generates the first interrupt, the employee information carried in the first VM context corresponding to the first interrupt may be, for example, the identification information of the physical Core or virtual Core. Of course, the first VM context that is issued by the intra-board Hypervisor in the first service board and that corresponds to the first interrupt may further carry the employer information, which may indicate a VM on the communication device that is allocated the hardware resource generating the first interrupt. For example, if the first hardware resource generating the first interrupt at the hardware layer of the first service board is allocated to a VM running on the intra-board Hypervisor in a second service board (that is, the VM running on the intra-board Hypervisor in the second service board is allocated the first hardware resource generating the first interrupt at the hardware layer of the first service board), the employer information carried in the first VM context corresponding to the first interrupt may be, for example, the identification information of the intra-board Hypervisor in the second service board, or the identification information of a first VM that runs on the intra-board Hypervisor in the second service board and that uses the first hardware resource generating the first interrupt, where the employer of the first hardware resource is the first VM. Of course, if the first VM context that is issued by the intra-board Hypervisor in the first service board and that corresponds to the first interrupt does not carry the corresponding employer information, the inter-board Hypervisor in a control board searches, according to the hardware resource configuration relationship, for a first VM that is allocated the first hardware resource generating the first interrupt (the first VM is the employer of the first hardware resource generating the first interrupt, where it is assumed that the first VM runs on the intra-board Hypervisor in the second service board) to know that the employer of the first hardware resource is the first VM, and the inter-board Hypervisor in the control board may further add the employer information of the first hardware resource (for example, the identifier of the first VM) to the first VM context corresponding to the first interrupt to obtain a to-be-issued second VM context corresponding to the first interrupt.

402: A second service board deployed in the communication device acquires the issued first VM context, or a second VM context that is obtained based on the first VM context and that corresponds to the first interrupt, and transfers the acquired first VM context or second VM context to a first VM running on the intra-board Hypervisor in the second service board for processing, where the employer of the first hardware resource is the first VM.

For example, the intra-board Hypervisor in the second service board may be used to acquire the issued first VM context or second VM context, and to send the acquired first VM context or second VM context to a first VM running on the intra-board Hypervisor in the second service board for processing.

In some embodiments of the present disclosure, if the first VM context corresponding to the first interrupt does not carry the employer identifier of the first hardware resource, the control board may add the employer identifier of the first hardware resource to the first VM context to obtain a second VM context corresponding to the first interrupt, where the first VM context is different from the second VM context. Or, if the first VM context corresponding to the first interrupt carries the employer identifier of the first hardware resource, the control board may remove the employer identifier of the first hardware resource carried in the first VM context to obtain a second VM context corresponding to the first interrupt, where the first VM context is different from the second VM context. Or, the control board may further add other information to the first VM context or remove other information carried in the first VM context, and/or perform format conversion for the first VM context, to obtain a second VM context that is different from the first VM context.

In some embodiments of the present disclosure, if the intra-board Hypervisor in a first service board writes a first VM context corresponding to a first interrupt into a shared memory (if any), the intra-board Hypervisor in a second service board is capable of acquiring the issued first VM context, or a second VM context that is obtained based on the first VM context and that corresponds to the first interrupt, from the shared memory. After determining that a VM context is to be issued to the second board based on the employer of a first hardware resource, the intra-board Hypervisor in the second service board may transfer the acquired first VM context or second VM context to a first VM running on the intra-board Hypervisor in the second service board for processing. Or, if the intra-board Hypervisor in a first service board issues a first VM context corresponding to a first interrupt in a broadcasting way, the intra-board Hypervisor in a second service board is capable of receiving the first VM context. After determining that the employer of a first hardware resource is a first VM, and further determining according to the employer of the first hardware resource that a VM context is to be issued to the second board, the intra-board Hypervisor in the second service board may transfer the acquired first VM context corresponding to the first interrupt to the first VM running on the intra-board Hypervisor in the second service board for processing.

In another embodiment of the present disclosure, the inter-board Hypervisor in a control board may first acquire a first VM context that is issued by the intra-board Hypervisor in a first service board and that corresponds to a first interrupt, and then issue the first VM context or a second VM context that is obtained based on the first VM context and that corresponds to the first interrupt in many ways. The first VM context or the second VM context issued by the inter-board Hypervisor may carry the employer information. Of course, the intra-board Hypervisor in a second service board is capable of acquiring the first VM context or the second VM context issued by the inter-board Hypervisor. For example, the inter-board Hypervisor may issue the first VM context or the second VM context in a broadcasting way (in this scenario, the intra-board Hypervisor in the second service board is capable of receiving the first VM context or the second VM context issued by the inter-board Hypervisor), or, the inter-board Hypervisor may send the first VM context or the second VM context to the intra-board Hypervisor in the second service board (in this scenario, the intra-board Hypervisor in the second service board is capable of receiving the first VM context or the second VM context issued by the inter-board Hypervisor), or, the inter-board Hypervisor may write the first VM context or the second VM context to a shared memory (if any), in which scenario, the intra-board Hypervisor in the second service board is capable of receiving the first VM context or the second VM context issued by the inter-board Hypervisor from the shared memory. The intra-board Hypervisor in the second service board may, after determining that the employer of a first hardware resource is a first VM, and further determining according to the employer of the first hardware resource that a VM context is to be issued to the second service board, transfer the acquired first VM context or second VM context to the first VM running on the intra-board Hypervisor in the second service board for processing.

Further, after a VM running on the intra-board Hypervisor in the second service board processes the first VM context or the second VM context, the intra-board Hypervisor in the second service board may issue a second VM processing context corresponding to the first interrupt. The intra-board Hypervisor in the first service board is capable of acquiring the issued second VM processing context, or a first VM processing context that is obtained based on the second VM processing context and that corresponds to the first interrupt. For example, after acquiring the second VM processing context that is issued by the intra-board Hypervisor in the second service board and that corresponds to the first interrupt, the inter-board Hypervisor may issue the second VM processing context or a first VM processing context that is obtained based on the second VM processing context and that corresponds to the first interrupt. The intra-board Hypervisor in the first service board may acquire the second VM processing context or first VM processing context issued by the inter-board Hypervisor. For another example, if the second VM processing context corresponding to the first interrupt does not carry the identifier (that is, employee identifier) of the first hardware resource, the control board may add the identifier of the first hardware resource to the second VM processing context to obtain a first VM processing context corresponding to the first interrupt, where the first VM processing context is different from the second VM processing context. Or, if the second VM processing context corresponding to the first interrupt carries the identifier of the first hardware resource, the control board may remove the identifier of the first hardware resource carried in the second VM processing context to obtain a first VM processing context corresponding to the first interrupt, where the first VM processing context is different from the second VM processing context. Or, the control board may further add other information to the second VM processing context and/or remove other information carried in the second VM processing context, and/or perform format conversion for the second VM processing context, to obtain a first VM processing context that is different from the second VM processing context.

It can be understood that, the way in which the intra-board Hypervisor in the second service board issues the second VM processing context corresponding to the first interrupt, may be similar to the way in which the intra-board Hypervisor in the first service board issues the first VM context corresponding to the first interrupt, and that the way in which the inter-board Hypervisor issues the first VM processing context or second VM processing context corresponding to the first interrupt, may also be similar to the way in which the inter-board Hypervisor issues the second VM context or first VM context corresponding to the first interrupt, and details are not provided herein again. In the embodiments of the present disclosure, a VM processing context corresponding to an interrupt may include the processing context of the interrupt (for example, a VM processing context corresponding to a first interrupt includes the processing context of the first interrupt), and of course, may further include other information originally contained in the VM processing context corresponding to the interrupt, and other information may further be added to the VM context corresponding to the interrupt as needed.

Based on the above, it can be seen that, in this embodiment, a first service board deployed in a communication device receives a first interrupt generated at the hardware layer of the first service board, and, if it is determined that the hardware resource generating the first interrupt at the hardware layer of the first service board is an allocated first hardware resource, issues a first VM context corresponding to the first interrupt; a second service board deployed in the communication device acquires the issued first VM context, or a second VM context that is obtained based on the first VM context and that corresponds to the first interrupt, and transfers the acquired first VM context or second VM context to a first VM running on the intra-board Hypervisor in the second service board for processing, where the employer of the first hardware resource is the first VM. On a communication device in this embodiment, part of resources at the hardware layer of each service board may be allocated to a VM running on another service board. Each service board completes the processing of a VM context by transferring the VM context. This method helps achieve cross-board sharing of hardware resources of service boards, optimize the utilization of hardware resources of a communication device, and further boost the processing performance.

In some embodiments of the present disclosure, the inter-board Hypervisor in a control board may further maintain the resource pool status information (for example, maintaining the resource pool status information in the status table of a resource pool), where the inter-board Hypervisor may maintain the resource pool status information in a shared memory (if any). The resource pool status information may indicate the usage status of a hardware resource at hardware layers of a plurality of service boards in a communication device, for example, the current usage of a hardware resource at the hardware layer of each service board, and the employer of a hardware resource at the hardware layer of each service board (for example, indicating which hardware resource at the hardware layer of each service board is allocated to a VM running on the intra-board Hypervisor in another service board, and which resource is not allocated). In addition, the inter-board Hypervisor in the control board may further periodically and/or non-periodically acquire the hardware resource usage of the hardware layer of each service board to update the resource pool status information maintained by itself, and to ensure that the resource pool status information maintained by itself indicates the latest hardware resource usage status of the hardware layer of each service board.

In some embodiments of the present disclosure, the inter-board Hypervisor in a control board may be utilized to achieve dynamic allocation or recovery of hardware resources.

For example, before a first service board issues a VM context corresponding to a first interrupt, if a control board deployed in the communication device (for example, the inter-board Hypervisor in the control board) detects that the current hardware resource usage of a hardware layer of a second service board exceeds a first threshold (or acquires a first hardware resource alarm instruction issued by the second service board, where the first hardware resource alarm instruction is issued by the second service board, for example, after the current hardware resource usage of the hardware layer of the second service board exceeds the first threshold or another threshold), and if the control board determines that the current hardware resource usage of the hardware layer of the first service board is lower than a second threshold, the control board may instruct the first service board to migrate resources to free a first hardware resource at the hardware layer of the first service board, and, allocate the freed first hardware resource at the hardware layer of the first service board, to a first VM running on the intra-board Hypervisor in the second service board, where the first threshold is higher than, lower than, or equal to the second threshold. For another example, if a control board, before acquiring a first VM context that is issued by a first service board deployed in the communication device and that corresponds to a first interrupt, detects that the current hardware resource usage of a hardware layer of a second service board exceeds a first threshold (or acquires a first hardware resource alarm instruction issued by the second service board, where the first hardware resource alarm instruction is issued by the second service board, for example, after the current hardware resource usage of the hardware layer of the second service board exceeds the first threshold or another threshold), and if the control board determines that the hardware layer of the first service board currently has an idle first hardware resource, the control board may allocate the idle first hardware resource at the hardware layer of the first service board, to a first VM running on the intra-board Hypervisor in the second service board. Of course, the control board may also allocate the idle first hardware resource (or other more hardware resources) at the hardware layer of the first service board to the first VM or another VM running on the intra-board Hypervisor in the second service board, using a static configuration method or another allocation method.

Still, for another example, after a first service board issues a first VM context corresponding to a first interrupt, if a control board (for example, the inter-board Hypervisor or another unit in the control board) acquires a second hardware resource alarm instruction issued by the intra-board Hypervisor in the first service board (or another service board), where the intra-board Hypervisor in the first service board (or another service board) may issue a hardware resource alarm instruction when the current hardware resource usage of the hardware layer of the first service board (or another service board) exceeds a first threshold (for example, 70%) or another threshold, the control board may also re-allocate part or all of an allocated hardware resource (for example, a first hardware resource) at the hardware layer of the first service board (or another service board), to a VM running on the intra-board Hypervisor in the first service board (or another service board) (equivalent to resource recovery). Of course, if a hardware layer of another service board in the communication device still has an idle hardware resource at this time, the control board may also allocate part or all of the idle hardware resource at the hardware layer of the another service board, to a VM running on the intra-board Hypervisor in the first service board (or another service board). Yet, for another example, when detecting that the hardware resource usage of a hardware layer of a first service board (or another service board) exceeds a first threshold, a control board may re-allocate part or all of an allocated hardware resource (for example, a first hardware resource) at the hardware layer of the first service board (or another service board), to a VM running on the intra-board Hypervisor in the first service board (or another service board). Still, for another example, if a control board detects that the hardware resource usage of a hardware layer of a first service board (or another service board) exceeds a first threshold, and if a hardware layer of another service board in the communication device has an idle hardware resource at this time, the control board may also, for example, allocate part or all of the idle hardware resource at the hardware layer of the another service board, to a VM running on the intra-board Hypervisor in the first service board (or another service board); and the rest may be deduced by analogy.

It can be seen that, based on the mechanism of foregoing examples, dynamic recovery or re-allocation of allocated hardware resources between service boards can be achieved.

For another example, it is assumed that a communication device is further deployed with a third service board, where the third service board includes a hardware layer, an intra-board Hypervisor running on the hardware layer, and at least one VM running on the intra-board Hypervisor. If a control board (for example, the inter-board Hypervisor or another unit in the control board) acquires a third hardware resource alarm instruction issued by the intra-board Hypervisor in a second service board (where the intra-board Hypervisor in the second service board may issue a hardware resource alarm instruction, for example, when the current hardware resource usage of the hardware layer of the second service board exceeds a first threshold (for example, 70%) or another threshold), and if the control board determines that the current hardware resource usage of the hardware layer of the third service board is lower than a second threshold (for example, 50%) or another threshold (the control board may determine the current hardware resource usage of the hardware layer of the third service board according to the resource pool status information maintained by itself, or query the current hardware resource usage of the hardware layer of the third service board from the third service board), the control board may instruct the intra-board Hypervisor in the third service board to migrate resources to free part of hardware resources (for example, a second hardware resource, which is, for example, a physical Core or a virtual Core) at the hardware layer of the third service board, and, allocate part or all of the freed hardware resource (for example, a second hardware resource) at the hardware layer of the third service board, to a VM (for example, a second VM or a first VM) running on the intra-board Hypervisor in the second service board. Still, for another example, if a control board (for example, the inter-board Hypervisor or another unit in the control board) acquires a third hardware resource alarm instruction issued by the intra-board Hypervisor in a second service board (or if the control board detects that the hardware resource usage of the hardware layer of the second service board exceeds a first threshold or another threshold), and if the control board determines that the hardware layer of the third service board currently has idle hardware resources (for example, a second hardware resource), which are part or all of hardware resources of the third service board, the control board may allocate part or all of the idle hardware resources (for example, a second hardware resource) at the hardware layer of the third service board, to a VM (for example, a first VM or a second VM) running on the intra-board Hypervisor in the second service board. Yet, for another example, if a control board detects that the hardware resource usage of a hardware layer of a second service board exceeds a first threshold or another threshold (for example, when periodically or non-periodically checking the hardware resource usage of the hardware layer of each service board, the control board detects that the hardware resource usage of the hardware layer of the second service board exceeds a first threshold or another threshold), the control board may also first instruct the intra-board Hypervisor in a service board in the communication device, where the current hardware resource usage of the intra-board Hypervisor is lower than a second threshold or another threshold, to migrate resources to free part of hardware resources at the hardware layer of the service board, and then allocate part or all of the freed hardware resources at the hardware layer of the service board, to a VM (for example, a second VM or a first VM) running on the intra-board Hypervisor in the second service board.

For example, if a control board allocates a second hardware resource at a hardware layer of a third service board to a first VM or a second VM running on the intra-board Hypervisor in a second service board, and if the third service board receives a second interrupt generated at the hardware layer of the third service board and determines that the hardware resource generating the second interrupt at the hardware layer of the third service board is the allocated second hardware resource, the third service board may issue a third VM context corresponding to the second interrupt. The second service board may acquire the issued third VM context, or a fourth VM context that is obtained based on the third VM context and that corresponds to the second interrupt, and transfer the acquired third VM context or fourth VM context to a second VM or a first VM running on the intra-board Hypervisor in the second service board for processing. Here, the employer of the second hardware resource is the second VM or the first VM. It can be understood that, the way in which the third service board and the control board issue a VM context corresponding to the second interrupt, may be similar to the previously introduced way in which the first service board and the control board issue a VM context corresponding to the first interrupt, and that the way in which the second service board acquires the issued third VM context or fourth VM context, may be similar to the previously introduced way in which the second service board acquires the issued first VM context or second VM context, and that the way in which the control board, based on the third VM context corresponding to the second interrupt, obtains the fourth VM context that is different from the third VM context and that corresponds to the second interrupt, may be similar to the previously introduced way in which the control board, based on the first VM context corresponding to the first interrupt, obtains the second VM context that is different from the first VM context and that corresponds to the first interrupt, and details are not provided herein again.

It can be seen that, based on the mechanism of foregoing examples, dynamic allocation of hardware resources between service boards can be achieved.

In some embodiments of the present disclosure, if the inter-board Hypervisor in a control board deployed in a communication device detects that the current hardware resource usage of a hardware layer of a second service board exceeds a first threshold (or acquires a fourth hardware resource alarm instruction issued by the second service board), and if the inter-board Hypervisor in the control board determines that the current hardware resource usage of the hardware layer of the control board is lower than a second threshold, the inter-board Hypervisor in the control board may instruct itself to migrate resources to free a third hardware resource at the hardware layer of the control board, and, allocate the freed third hardware resource at the hardware layer of the control board, to a second VM or a first VM or a fifth VM running on the intra-board Hypervisor in the second service board. For another example, if a control board detects that the current hardware resource usage of a hardware layer of a second service board exceeds a first threshold (or acquires a fourth hardware resource alarm instruction issued by the second service board), and if the control board determines that a hardware layer of the control board currently has an idle third hardware resource, the control board may allocate the idle third hardware resource at the hardware layer of the control board, to a second VM or a first VM or a fifth VM running on the intra-board Hypervisor in the second service board. Here, the intra-board Hypervisor in the second service board may issue a fourth hardware resource alarm instruction, for example, when the hardware resource usage of the hardware layer of the second service board exceeds a first threshold (for example, 70%) or another threshold.

For example, if a control board allocates a third hardware resource at a hardware layer of the control board to a first VM or a second VM or a fifth VM running on the intra-board Hypervisor in a second service board, and if the inter-board Hypervisor in the control board receives a third interrupt generated at the hardware layer of the control board and determines that the hardware resource generating the third interrupt at the hardware layer of the control board is the allocated third hardware resource, the control board may issue a fifth VM context corresponding to the third interrupt, where the employer of the third hardware resource is the first VM or the second VM or the fifth VM running on the intra-board Hypervisor in the second service board. The second service board acquires the issued fifth VM context, or a sixth VM context that is obtained based on the fifth VM context and that corresponds to the third interrupt, and transfers the acquired fifth VM context or sixth VM context corresponding to the third interrupt, to the second VM or the first VM or the fifth VM running on the intra-board Hypervisor in the second service board for processing, where the way in which the sixth VM context is obtained based on the fifth VM context, may be similar to the way in which the second VM context is obtained based on the first VM context.

In some embodiments of the present disclosure, if the inter-board Hypervisor in a control board deployed in a communication device detects that the current hardware resource usage of the hardware layer of the control board exceeds a first threshold or another threshold, and determines that the current hardware resource usage of a hardware layer of a third service board deployed in the communication device is lower than a second threshold or another threshold, the inter-board Hypervisor in the control board may instruct the intra-board Hypervisor in the third service board to migrate resources to free a fourth hardware resource at the hardware layer of the third service board, and, allocate the freed fourth hardware resource at the hardware layer of the third service board, to a third VM running on the intra-board Hypervisor in the control board. For another example, if the inter-board Hypervisor in a control board deployed in a communication device detects that the current hardware resource usage of the hardware layer of the control board exceeds a first threshold or another threshold, and determines that a hardware layer of a third service board currently has an idle fourth hardware resource, the inter-board Hypervisor in the control board may allocate the idle fourth hardware resource at the hardware layer of the third service board, to a third VM running on the intra-board Hypervisor in the control board.

For example, if a control board allocates a fourth hardware resource at a hardware layer of a third service board to a third VM running on the intra-board Hypervisor in the control board, and if the inter-board Hypervisor in the control board acquires a seventh VM context that is issued by the third service board and that corresponds to a fourth interrupt, where the seventh VM context corresponding to the fourth interrupt is issued by the third service board after the third service board determines that the fourth hardware resource generating the fourth interrupt at the hardware layer of the third service board is an allocated hardware resource in response to the fourth interrupt generated at the hardware layer of the third service board, the intra-board Hypervisor in the control board may acquire the seventh VM context corresponding to the fourth interrupt and transfer the acquired seventh VM context, or an eighth VM context that is obtained based on the seventh VM context and that corresponds to the fourth interrupt, to a third VM running on the intra-board Hypervisor in the control board for processing, where the employer of the fourth hardware resource is the third VM, and the way in which the eighth VM context is obtained based on the seventh VM context, may be similar to the way in which the second VM context is obtained based on the first VM context.

It can be understood that, the way in which each intra-board Hypervisor issues a hardware resource alarm instruction may be similar to the way in which an intra-board Hypervisor issues a VM context corresponding to an interrupt, and details are not provided herein again.

It should be noted that, in the solution description in the embodiment of the present disclosure, an operation performed by a service board, for example, may be specifically performed by the intra-board Hypervisor or another unit in the service board, an operation performed by the intra-board Hypervisor in a service board, of course, may also be performed by another unit in the service board, and an operation performed by a unit in a service board can be considered as an operation performed by the service board; similarly, an operation performed by a control board, for example, may be specifically performed by the intra-board Hypervisor, inter-board Hypervisor, or another unit in the control board, an operation performed by the intra-board Hypervisor or inter-board Hypervisor in a control board, of course, may also be performed by another unit in the control board, and an operation performed by a unit in a control board can be considered as an operation performed by the control board.

It should be noted that, a communication device in the embodiment of the present disclosure may be, for example, a network access device such as a base station, an access point, or a base station controller, or a core network device such as a mobility management network element or a packet data network gateway, or another communication network element or device.

For better understanding and implementation of the foregoing solution described in the embodiment of the present disclosure, the following uses an application scenario of the solution implemented on the communication device whose architecture is illustrated in FIG. 5-*a* as an example to describe the foregoing solution, where the communication device including a control board, a service board A, a service board B, and a service board C, and with the inter-board Hypervisor running on the hardware layer of the control board, is taken as an example, and the intra-board Hypervisor in each service board may access a shared memory, which, for example, is part of a memory of the control board.

Referring to FIG. 5-*b*, another virtualization management method for managing hardware resources of a communication device according to an embodiment of the present disclosure may include:

501: The inter-board Hypervisor allocates a Core-1 at a hardware layer of the service board A to VM-b1 running on the service board B.

In some embodiments of the present disclosure, the inter-board Hypervisor may also maintain the resource pool status information (for example, maintaining the resource pool status information in the status table of a resource pool) in a shared memory (if any). The resource pool status information may indicate the usage status of a hardware resource at hardware layers of a plurality of service boards in a communication device, for example, the current usage of a hardware resource at the hardware layer of each service board, and the employer of a hardware resource at the hardware layer of each service board (that is, indicating which hardware resource at the hardware layer of each service board is allocated and which resource is not allocated). In addition, the inter-board Hypervisor may further periodically and/or non-periodically acquire the hardware resource usage of the hardware layer of each service board to update the resource pool status information maintained by itself, and to ensure that the resource pool status information maintained by itself indicates the latest hardware resource usage status of the hardware layer of each service board.

502: The Core-1 at the hardware layer of the service board A generates an interrupt b1.

503: The intra-board Hypervisor in the service board A receives the interrupt b1 generated by the Core-1, and after determining that the Core-1 is an allocated hardware resource, issues a VM context corresponding to the interrupt b1.

The VM context that is issued by the intra-board Hypervisor in the service board A and that corresponds to the interrupt b1, may carry the identifier (employee identifier) of the Core-1, the identification information (employer identifier) of the intra-board Hypervisor in the service board B, and so on.

It can be understood that, it is taken as an example herein that the hardware resource Core-1 generating the interrupt at the hardware layer of the service board A is allocated. Of course, if the hardware resource Core-1 is not allocated, the intra-board Hypervisor in the service board A may transfer the VM context corresponding to the interrupt b1 to a VM running on the intra-board Hypervisor in the service board A.

504: The inter-board Hypervisor, after acquiring the VM context that is issued by the intra-board Hypervisor in the service board A and that corresponds to the interrupt b1, may transfer the VM context corresponding to the interrupt b1 to the intra-board Hypervisor in the service board B.

505: The intra-board Hypervisor in the service board B, after acquiring the VM context corresponding to the interrupt b1, transfers the VM context corresponding to the interrupt b1 to the VM-b1 running on the intra-board Hypervisor in the service board B.

506: The virtual machine VM-b1, after processing the VM context corresponding to the interrupt b1, sends a VM processing context corresponding to the interrupt b1 to the intra-board Hypervisor in the service board B.

507: The intra-board Hypervisor in the service board B issues the VM processing context corresponding to the interrupt b1.

The VM processing context that is issued by the intra-board Hypervisor in the service board B and that corresponds to the interrupt b1, may carry the identifier (employee identifier) of the Core-1, the identifier (employer identifier) of the intra-board Hypervisor in the service board B, and other information.

508: The inter-board Hypervisor, after acquiring the VM processing context that is issued by the intra-board Hypervisor in the service board B and that corresponds to the interrupt b1, may transfer the VM processing context corresponding to the interrupt b1 to the intra-board Hypervisor in the service board A.

509: The intra-board Hypervisor in the service board A, after acquiring the VM processing context corresponding to the interrupt b1, may transfer the VM processing context corresponding to the interrupt b1 to the Core-1 at the hardware layer of the service board A, where the Core-1 may handle a next interrupt after receiving the VM processing context corresponding to the interrupt b1.

It can be understood that, between the inter-board Hypervisor and the intra-board Hypervisor in each service board, and between intra-board Hypervisors in any service boards, information interaction may be performed directly or using a shared memory. For example, the inter-board Hypervisor (or the intra-board Hypervisor in a service board) may write information into a shared memory, and the intra-board Hypervisor in a service board (or the inter-board Hypervisor) may read the information from the shared memory; or, the inter-board Hypervisor (or the intra-board Hypervisor in a service board) may send information directly to a receiving end, and the receiving end directly receives the information sent by a sending end; and the rest may be deduced by analogy.

In addition, the inter-board Hypervisor may further dynamically allocate or recover a hardware resource of each service board.

For example, assuming that the hardware resource usage of a hardware layer of the service board B exceeds a first threshold, the intra-board Hypervisor in the service board B may issue a hardware resource alarm instruction. If the inter-board Hypervisor acquires the hardware resource alarm instruction issued by the intra-board Hypervisor in the service board B, and determines that the current hardware resource usage of a hardware layer of the service board C is lower than a second threshold (for example, 50%), the inter-board Hypervisor may instruct the intra-board Hypervisor in the service board C to migrate resources to free partial hardware resources (for example, a physical Core or a virtual Core) at the hardware layer of the service board C, and, allocate part or all of the freed hardware resource at the hardware layer of the service board C, to a VM running on the intra-board Hypervisor in the service board B; or if the inter-board Hypervisor determines that the hardware layer of the service board C currently has an idle hardware resource (for example, a physical Core or a virtual Core is in the idle state), the inter-board Hypervisor may allocate part or all of the idle hardware resource at the hardware layer of the service board C to a VM running on the intra-board Hypervisor in the service board B. In addition, if the inter-board Hypervisor detects that the hardware resource usage of the hardware layer of the service board B exceeds a first threshold, the inter-board Hypervisor may allocate part or all of an idle hardware resource at a hardware layer of another service board to a VM running on the intra-board Hypervisor in the service board B. Or, if the inter-board Hypervisor detects that the hardware resource usage of the hardware layer of the service board B exceeds a first threshold, the inter-board Hypervisor may also first instruct the intra-board Hypervisor in a service board whose current hardware resource usage is lower than a second threshold, to migrate resources to free part of hardware resources at the hardware layer of the service board, and then allocate part or all of the freed hardware resources at the hardware layer of the service board, to a VM running on the intra-board Hypervisor in the service board B. It can be seen that, based on the foregoing mechanism, dynamic allocation of hardware resources between service boards can be achieved.

For another example, if the hardware resource usage of the hardware layer of the service board A exceeds a first threshold, the intra-board Hypervisor in the service board A may issue a hardware resource alarm instruction. If the inter-board Hypervisor acquires the hardware resource alarm instruction issued by the intra-board Hypervisor in the service board A, the inter-board Hypervisor may also re-allocate part or all of the allocated hardware resource at the hardware layer of the service board A to a VM running on the intra-board Hypervisor in the service board A. Of course, if a hardware layer of another service board in the communication device has an idle hardware resource at this time, the inter-board Hypervisor may also allocate part or all of the idle hardware resource at the hardware layer of the another service board, to a VM running on the intra-board Hypervisor in the service board A. In addition, when detecting that the hardware resource usage of the hardware layer of the service board A exceeds a first threshold, the inter-board Hypervisor may also re-allocate part or all of the allocated hardware resource at the hardware layer of the service board A to a VM running on the intra-board Hypervisor in the service board A. It can be seen that, based on the foregoing mechanism, dynamic recovery of hardware resources between service boards can be achieved. Or, if the inter-board Hypervisor detects that the hardware resource usage of the hardware layer of the service board A exceeds a first threshold, and if a hardware layer of another service board (for example, the service board C) on the communication device has an idle hardware resource at this time, the inter-board Hypervisor may also allocate part or all of the idle hardware resource at the hardware layer of the another service board, to a VM running on the intra-board Hypervisor in the service board A; and the rest may be deduced by analogy.

It can be seen that, based on the above, a service board in a communication device in this embodiment includes a hardware layer, an intra-board Hypervisor running on the hardware layer, and at least one VM running on the intra-board Hypervisor; on the hardware layer of a control board and/or the hardware layer of a service board in the communication device, an inter-board Hypervisor is running, where the inter-board Hypervisor acquires the VM context that is issued by the intra-board Hypervisor in the service board A and that corresponds to the interrupt b1, and then issues the VM context corresponding to the interrupt b1; and the intra-board Hypervisor in the service board B, after acquiring the VM context that is issued by the inter-board Hypervisor and that corresponds to the interrupt b1, sends the VM context corresponding to the interrupt b1 to a VM running on the intra-board Hypervisor in the service board B. On a communication device in this embodiment, not only an inter-board Hypervisor is running, but also an intra-board Hypervisor is running on the hardware layer of each service board. Part of resources at a hardware layer of a service board may be allocated to a VM running on another service board. With the inter-board Hypervisor transferring a VM context, each intra-board Hypervisor completes the processing of the VM context. Based on two layers of Hypervisors, this method helps achieve cross-board sharing of hardware resources of service boards, further optimize the utilization of hardware resources of a communication device, and further boost the processing performance of a communication device.

For better understanding and implementation of the foregoing method described in the embodiment of the present disclosure, related apparatuses configured to implement the foregoing method are further provided.

Referring to FIG. 6-a, a communication device 600 provided in an embodiment of the present disclosure may include:

a first service board 601, a second service board 602, and a control board 603, where the first service board 601 may include a hardware layer 6011, an intra-board Hypervisor 6012 running on the hardware layer, and at least one VM 6013 running on the intra-board Hypervisor 6012, the second service board 602 may include a hardware layer 6021, an intra-board Hypervisor 6022 running on the hardware layer, and at least one VM 6023 running on the intra-board Hypervisor 6022, and the control board 603 may include a hardware layer 6031 and an inter-board Hypervisor 6032 running on the hardware layer.

The intra-board Hypervisor 6012 in the first service board 601 is configured to respond to a first interrupt generated at the hardware layer 6011 of the first service board 601, and to issue a first VM context corresponding to the first interrupt after determining that a first hardware resource generating the first interrupt at the hardware layer 6011 of the first service board 601 is an allocated hardware resource.

The inter-board Hypervisor 6032 in the control board 603 is configured to acquire the first VM context that is issued by the intra-board Hypervisor 6012 in the first service board 601 and that corresponds to the first interrupt, and to issue the first VM context or a second VM context that is obtained based on the first VM context and that corresponds to the first interrupt.

The intra-board Hypervisor 6022 in the second service board 602 is configured to: after acquiring the issued first VM context or second VM context, transfer the acquired first VM context or second VM context to a first VM running on the intra-board Hypervisor in the second service board for processing, where the first VM is the employer of the first hardware resource.

In some embodiments of the present disclosure, if the first VM context corresponding to the first interrupt does not carry the employer identifier of the first hardware resource, the inter-board Hypervisor 6032 may add the employer identifier of the first hardware resource to the first VM context to obtain a second VM context corresponding to the first interrupt, where the first VM context is different from the second VM context. Or, if the first VM context corresponding to the first interrupt carries the employer identifier of the first hardware resource, the inter-board Hypervisor 6032 may remove the employer identifier of the first hardware resource carried in the first VM context to obtain a second VM context corresponding to the first interrupt, where the first VM context is different from the second VM context. Or, the inter-board Hypervisor 6032 may also add other information to the first VM context and/or remove other information carried in the first VM context, and/or perform format conversion for the first VM context, to obtain a second VM context that is different from the first VM context.

Referring to FIG. 6-b, in some embodiments of the present disclosure, the communication device 600, for example, may further include a shared memory 605.

In some embodiments of the present disclosure, the inter-board Hypervisor 6032 may be configured to acquire, from the shared memory 605, the first VM context that is issued by the intra-board Hypervisor 6012 in the first service board 601 and that corresponds to the first interrupt, or receive the first VM context that is issued by the intra-board Hypervisor 6012 in the first service board 601 and that corresponds to the first interrupt; and to issue the first VM context, or a second VM context that is obtained based on the first VM context and that corresponds to the first interrupt, to the shared memory 605.

In other embodiments of the present disclosure, the inter-board Hypervisor 6032 may be configured to acquire, from the shared memory 605, the first VM context that is issued by the intra-board Hypervisor 6012 in the first service board 601 and that corresponds to the first interrupt, or receive the first VM context that is issued by the intra-board Hypervisor 6012 in the first service board 601 and that corresponds to the first interrupt; and after determining that the employer of the first hardware resource is the first VM, and further determining according to the employer of the first hardware resource that a VM context is to be issued to the second service board 602, to issue the first VM context, or a second VM context that is obtained based on the first VM context and that corresponds to the first interrupt, to the intra-board Hypervisor 6022 in the second service board 602.

In another embodiment of the present disclosure, the inter-board Hypervisor 6032 may be further configured to maintain the resource pool status information, where the resource pool status information indicates the usage status of a hardware resource at the hardware layers of a plurality of service boards in the communication device 600, and/or the employer of a hardware resource at the hardware layers of a plurality of service boards in the communication device 600.

In an embodiment of the present disclosure, if the inter-board Hypervisor 6032, before acquiring the first VM context that is issued by the intra-board Hypervisor 6012 in the first service board 601 and that corresponds to the first interrupt, detects that the current hardware resource usage of the hardware layer 6021 of the second service board 602 exceeds a first threshold (or acquires a first hardware resource alarm instruction issued by the second service board 602 before acquiring the first VM context that is issued by the intra-board Hypervisor 6012 in the first service board 601 and that corresponds to the first interrupt), and determines that the current hardware resource usage of the hardware layer 6011 of the first service board 601 is lower than a second threshold, the inter-board Hypervisor 6032 may be further configured to instruct the intra-board Hypervisor 6012 in the first service board 601 to migrate resources to free the first hardware resource at the hardware layer of the first service board, and to allocate the freed first hardware resource at the hardware layer of the first service board 601 to a first VM running on the intra-board Hypervisor 6022 in the second service board 602, where the first threshold is higher than, lower than, or equal to the second threshold.

In another embodiment of the present disclosure, if the inter-board Hypervisor 6032, before acquiring the first VM context that is issued by the intra-board Hypervisor 6012 in the first service board 601 and that corresponds to the first interrupt, detects that the current hardware resource usage of the hardware layer 6021 of the second service board 602 exceeds a first threshold (or acquires a first hardware resource alarm instruction issued by the second service board 602 before acquiring the first VM context that is issued by the intra-board Hypervisor 6012 in the first service board 601 and that corresponds to the first interrupt), and determines that the hardware layer 6011 of the first service board 601 currently has an idle first hardware resource, the inter-board Hypervisor 6032 may be further configured to allocate the idle first hardware resource at the hardware layer of the first service board 601 to a first VM running on the intra-board Hypervisor 6022 in the second service board 602, where the first threshold is higher than, lower than, or equal to the second threshold.

In an embodiment of the present disclosure, the intra-board Hypervisor in each service board issues a hardware resource alarm instruction when the current hardware resource usage of the hardware layer of the corresponding service board exceeds a first threshold or another threshold. For example, the first hardware resource alarm instruction is issued by the second service board 602 after the current hardware resource usage of the hardware layer 6021 of the second service board 602 exceeds the first threshold or another threshold.

In an embodiment of the present disclosure, if the inter-board Hypervisor 6032, after issuing a first VM context or a second VM context, detects that the current hardware resource usage of the hardware layer of the first service board 601 exceeds a first threshold or another threshold, or acquires a second hardware resource alarm instruction issued by the intra-board Hypervisor 6012 in the first service board 601, the inter-board Hypervisor 6032 may be further configured to re-allocate the allocated first hardware resource at the hardware layer 6011 of the first service board 601 to the VM 6013 running on the intra-board Hypervisor 6012 in the first service board 601, where the second hardware resource alarm instruction is issued by the first service board 601 after the current hardware resource usage of the hardware layer 6011 of the first service board 601 exceeds the first threshold or another threshold.

In another embodiment of the present disclosure, referring to FIG. 6-c, the communication device 600 may further include a third service board 604, where the third service board 604 may include a hardware layer 6041, an intra-board Hypervisor 6042 running on the hardware layer 6041, and at least one VM 6043 running on the intra-board Hypervisor 6042.

If the inter-board Hypervisor 6032 detects that the current hardware resource usage of the hardware layer of the second service board 602 exceeds a first threshold or acquires a third hardware resource alarm instruction issued by the second service board 602, and if the inter-board Hypervisor 6032 determines that the current hardware resource usage of the hardware layer of the third service board 604 is lower than a second threshold, the inter-board Hypervisor 6032 may be further configured to instruct the third service board 604 to migrate resources to free a second hardware resource at the hardware layer of the third service board 604, and to allocate the freed second hardware resource at the hardware layer 6041 of the third service board 604 to a second VM or a first VM running on the intra-board Hypervisor 6022 in the second service board 602; if the inter-board Hypervisor 6032 acquires a third VM context that is issued by the intra-board Hypervisor 6042 in the third service board 604 and that corresponds to a second interrupt, the inter-board Hypervisor 6032 may be further configured to issue the third VM context, or a fourth VM context that is obtained based on the third VM context and that corresponds to the second interrupt, so that the intra-board Hypervisor 6022 in the second service board 602, after acquiring the issued third VM context or fourth VM context, transfers the acquired third VM context or fourth VM context to a second VM or a first VM running on the intra-board Hypervisor 6022 in the second service board 602 for processing. Here, the employer of the second hardware resource is the second VM or the first VM, and the third VM context corresponding to the second interrupt is issued by the intra-board Hypervisor 6042 in the third service board 604 after the intra-board Hypervisor 6042 in the third service board 604 determines that the second hardware resource generating the second interrupt at the hardware layer 6041 of the third service board 604 is an allocated hardware resource in response to the second interrupt generated at the hardware layer 6041 of the third service board 604.

For another example, if the inter-board Hypervisor 6032 detects that the current hardware resource usage of the hardware layer of the second service board exceeds a first threshold or acquires a second hardware resource alarm instruction issued by the second service board 602, and if the inter-board Hypervisor 6032 determines that the hardware layer of the third service board 604 currently has an idle second hardware resource, the inter-board Hypervisor 6032 may be further configured to allocate the idle second hardware resource at the hardware layer of the third service board 604 to a second VM or a first VM running on the intra-board Hypervisor in the second service board; if the inter-board Hypervisor 6032 acquires a third VM context that is issued by the intra-board Hypervisor 6042 in the third service board 604 and that corresponds to a second interrupt, the inter-board Hypervisor 6032 may be further configured to issue the third VM context, or a fourth VM context that is obtained based on the third VM context and that corresponds to the second interrupt, so that the intra-board Hypervisor 6022 in the second service board 602, after acquiring the issued third VM context or fourth VM context, transfers the acquired third VM context or fourth VM context to a second VM or a first VM running on the intra-board Hypervisor 6022 in the second service board 602 for processing. Here, the employer of the second hardware resource is the second VM or the first VM, and the third VM context corresponding to the second interrupt is issued by the intra-board Hypervisor 6042 in the third service board 604 after the intra-board Hypervisor 6042 in the third service board 604 determines that the second hardware resource generating the second interrupt at the hardware layer 6041 of the third service board 604 is an allocated hardware resource in response to the second interrupt generated at the hardware layer 6041 of the third service board 604.

It can be understood that, the communication device 600 in this embodiment may be a communication device in the foregoing method embodiments, the working mechanism of running a virtualization system of the communication device 600 in this embodiment may be the same as a working mechanism described in the foregoing method embodiments, and functions of each function module may be specifically implemented according to the methods described in the foregoing method embodiments. For a specific function implementation process, reference may be made to relevant description in the foregoing method embodiments, and details are not provided herein again.

Referring to FIG. 7-a, a communication device 700 provided in an embodiment of the present disclosure may include:

a first service board 701 and a second service board 702, where the first service board 701 may include a hardware layer 7011, an intra-board Hypervisor 7012 running on the hardware layer 7011, and at least one VM 7013 running on the intra-board Hypervisor 7012, and the second service board 702 may include a hardware layer 7021, an intra-board Hypervisor 7022 running on the hardware layer 7021, and at least one VM 7023 running on the intra-board Hypervisor 7022.

The intra-board Hypervisor 7012 in the first service board 701 is configured to receive a first interrupt generated at the hardware layer 7011 of the first service board 701, and to issue a first VM context corresponding to the first interrupt after determining that a first hardware resource generating the first interrupt at the hardware layer 7011 of the first service board 701 is an allocated hardware resource.

The intra-board Hypervisor 7022 in the second service board 702 is configured to acquire the issued first VM context, or a second VM context that is obtained based on the first VM context and that corresponds to the first interrupt, and to transfer the acquired first VM context or second VM context to a first VM 7023 running on the intra-board Hypervisor 7022 in the second service board 702 for processing, where the employer of the first hardware resource is the first VM 7023.

Referring to FIG. 7-b, in some embodiments of the present disclosure, the communication device 700 may further include a shared memory 705.

In some embodiments of the present disclosure, the intra-board Hypervisor 7012 in the first service board 701 may be specifically configured to receive a first interrupt generated at the hardware layer 7011 of the first service board 701, and to issue a first VM context corresponding to the first interrupt to the shared memory 705 after determining that the first hardware resource generating the first interrupt at the hardware layer 7011 of the first service board 701 is an allocated hardware resource.

The intra-board Hypervisor 7022 in the second service board 702 may be specifically configured to acquire the issued first VM context or second VM context from the shared memory 705, and after determining that the employer of the first hardware resource is a first VM, and further determining according to the employer of the first hardware resource that a VM context is to be issued to the second service board 702, to issue the acquired first VM context or second VM context to the first VM running on the intra-board Hypervisor in the second service board 702.

In another embodiment of the present disclosure, referring to FIG. 7-c, the communication device 700, for example, may further include a control board 703, where the control board 703 includes a hardware layer 7031 and an inter-board Hypervisor 7032 running on the hardware layer.

The intra-board Hypervisor 7012 in the first service board 701 may be specifically configured to receive a first interrupt generated at the hardware layer 7011 of the first service board 701, and to issue a first VM context corresponding to the first interrupt to the shared memory 705 after determining that the first hardware resource generating the first interrupt at the hardware layer 7011 of the first service board 701 is an allocated hardware resource.

The inter-board Hypervisor 7032 is configured to acquire the first VM context corresponding to the first interrupt from the shared memory 705, and after determining that the employer of the first hardware resource is a first VM, and further determining according to the employer of the first hardware resource that a VM context is to be issued to the second service board 702, to issue the first VM context or a second VM context that is obtained based on the first VM context and that corresponds to the first interrupt, to the intra-board Hypervisor 7022 in the second service board 702.

The intra-board Hypervisor 7022 in the second service board 702 may be specifically configured to receive the first VM context or second VM context issued by the inter-board Hypervisor 7032, and to transfer the acquired first VM context or second VM context to a first VM running on the intra-board Hypervisor 7022 in the second service board 702 for processing.

For another example, the intra-board Hypervisor 7012 in the first service board 701 may be specifically configured to receive a first interrupt generated at the hardware layer 7011 of the first service board 701, and to send a VM context corresponding to the first interrupt to the inter-board Hypervisor 7032 after determining that the first hardware resource generating the first interrupt at the hardware layer 7011 of the first service board 701 is an allocated hardware resource.

The inter-board Hypervisor 7032 is configured to acquire the first VM context that is issued by the intra-board Hypervisor 7012 in the first service board 701 and that corresponds to the first interrupt, and after determining that the employer of the first hardware resource is a first VM, and further determining according to the determined employer of the first hardware resource that a VM context is to be issued to the second service board 702, to issue the first VM context or a second VM context that is obtained based on the first VM context and that corresponds to the first interrupt, to the intra-board Hypervisor 7022 in the second service board 702.

The intra-board Hypervisor 7022 in the second service board 702 may be specifically configured to receive the first VM context or second VM context issued by the inter-board Hypervisor 7032, and to transfer the acquired first VM context or second VM context to a first VM running on the intra-board Hypervisor 7022 in the second service board 702 for processing.

For another example, the intra-board Hypervisor 7012 in the first service board 701 may be specifically configured to receive a first interrupt generated at the hardware layer 7011 of the first service board 701, and to send a first VM context corresponding to the first interrupt to the inter-board Hypervisor 7032 after determining that the hardware resource generating the first interrupt at the hardware layer 7011 of the first service board 701 is an allocated hardware resource.

The inter-board Hypervisor 7032 is configured to acquire a first VM context that is issued by the intra-board Hypervisor 7012 in the first service board 701 and that corresponds to the first interrupt, and to issue the first VM context or a second VM context that is obtained based on the first VM context and that corresponds to the first interrupt to the shared memory 705.

The intra-board Hypervisor 7022 in the second service board 702 may be specifically configured to acquire the first VM context or second VM context wrote into the shared memory 705 by the inter-board Hypervisor 7032, and after determining that the employer of the first hardware resource is a first VM, and further determining according to the employer of the first hardware resource that a VM context is to be issued to the second service board 702, to issue the acquired first VM context or second VM context to the first VM running on the intra-board Hypervisor 7022 in the second service board 702.

In some embodiments of the present disclosure, the inter-board Hypervisor 7032 may be further configured to maintain the resource pool status information, where the resource pool status information maintained by the inter-board Hypervisor 7032 indicates the usage status of a hardware resource at the hardware layers of a plurality of service boards in the communication device 700, and/or the employer of a hardware resource at the hardware layers of a plurality of service boards in the communication device 700.

In an embodiment of the present disclosure, if the inter-board Hypervisor 7032, before acquiring the first VM context that is issued by the intra-board Hypervisor 7012 in the first service board 701 and that corresponds to the first interrupt, detects that the current hardware resource usage of the hardware layer 7021 of the second service board 702 exceeds a first threshold (or acquires a first hardware resource alarm instruction issued by the second service board 702 before acquiring the VM context that is issued by the intra-board Hypervisor 7012 in the first service board 701 and that corresponds to the first interrupt), and determines that the current hardware resource usage of the hardware layer 7011 of the first service board 701 is lower than a second threshold, the inter-board Hypervisor 7032 may be further configured to instruct the intra-board Hypervisor 7012 in the first service board 701 to migrate resources to free the first hardware resource at the hardware layer of the first service board, and to allocate the freed first hardware resource at the hardware layer of the first service board 701 to a first VM running on the intra-board Hypervisor 7022 in the second service board 702. Here, the first hardware resource alarm instruction is issued by the second service board 702, for example, after the current hardware resource usage of the hardware layer of the second service board 702 exceeds the first threshold or another threshold, and the first threshold is higher than, lower than, or equal to the second threshold.

In another embodiment of the present disclosure, if the inter-board Hypervisor 7032, before acquiring the first VM context that is issued by the intra-board Hypervisor 7012 in the first service board 701 and that corresponds to the first interrupt, detects that the current hardware resource usage of the hardware layer 7021 of the second service board 702 exceeds a first threshold (or acquires a first hardware resource alarm instruction issued by the second service board 702 before acquiring the VM context that is issued by the intra-board Hypervisor 7012 in the first service board 701 and that corresponds to the first interrupt), and determines that the hardware layer 7011 of the first service board 701 currently has an idle first hardware resource, the inter-board Hypervisor 7032 may be further configured to allocate the idle first hardware resource at the hardware layer of the first service board 701 to a first VM running on the intra-board Hypervisor 7022 in the second service board 702, where the first hardware resource alarm instruction is issued by the second service board 702, for example, after the current hardware resource usage of the hardware layer of the second service board 702 exceeds the first threshold or another threshold, and the first threshold is higher than, lower than, or equal to the second threshold.

In an embodiment of the present disclosure, if the inter-board Hypervisor 7032, after issuing the first VM context or the second VM context, detects that the current hardware resource usage of the hardware layer of the first service board 701 exceeds a first threshold or another threshold (or acquires a second hardware resource alarm instruction issued by the intra-board Hypervisor 7012 in the first service board 701 after issuing the first VM context or the second VM context), the inter-board Hypervisor 7032 may be further configured to re-allocate the allocated first hardware resource at the hardware layer 7011 of the first service board 701 to the VM 7013 running on the intra-board Hypervisor 7012 in the first service board 701. Here, the second hardware resource alarm instruction is issued by the first service board 701, for example, after the current hardware resource usage of the hardware layer of the first service board 701 exceeds the first threshold or another threshold.

In another embodiment of the present disclosure, referring to FIG. 7-d, the communication device 700 may further include a third service board 704, where the third service board 704 may include a hardware layer 7041, an intra-board Hypervisor 7042 running on the hardware layer, and at least one VM 7043 running on the intra-board Hypervisor 7042.

If the inter-board Hypervisor 7032 detects that the current hardware resource usage of the hardware layer of the second service board 702 exceeds a first threshold (or acquires a third hardware resource alarm instruction issued by the second service board 702), and determines that the current hardware resource usage of the hardware layer of the third service board 704 is lower than a second threshold, the inter-board Hypervisor 7032 may be further configured to instruct the third service board 704 to migrate resources to free a second hardware resource at the hardware layer of the third service board 704, and to allocate the freed second hardware resource at the hardware layer 7041 of the third service board 704 to a second VM or a first VM running on the intra-board Hypervisor 7022 in the second service board 702, where the third hardware resource alarm instruction is issued by the second service board 702, for example, after the current hardware resource usage of the hardware layer of the second service board 702 exceeds the first threshold or another threshold.

Or, if the inter-board Hypervisor 7032 detects that the current hardware resource usage of the hardware layer of the second service board 702 exceeds a first threshold (or acquires a third hardware resource alarm instruction issued by the second service board 702), and determines that the hardware layer of the third service board 704 currently has an idle second hardware resource, the inter-board Hypervisor 7032 may be further configured to allocate the idle second hardware resource at the hardware layer of the third service board 704 to a second VM or a first VM running on the intra-board Hypervisor 7022 in the second service board 702. Here, the third hardware resource alarm instruction is issued by the second service board 702, for example, after the current hardware resource usage of the hardware layer of the second service board 702 exceeds the first threshold or another threshold.

The intra-board Hypervisor 7042 in the third service board 704 is configured to issue a third VM context corresponding to a second interrupt, if the second interrupt generated at the hardware layer of the third service board 704 is received and it is determined that the hardware resource generating the second interrupt at the hardware layer of the third service board 704 is an allocated second hardware resource.

The intra-board Hypervisor 7022 in the second service board 702 is further configured to acquire the issued third VM context, or a fourth VM context that is obtained based on the third VM context and that corresponds to the second interrupt, and to transfer the acquired third VM context or fourth VM context to a second VM or a first VM running on the intra-board Hypervisor 7022 in the second service board 702.

In another embodiment of the present disclosure, referring to FIG. 7-e, the control board 703 may further include an intra-board Hypervisor 7033 running on the hardware layer 7031 and at least one VM 7034 running on the intra-board Hypervisor 7033.

The inter-board Hypervisor 7032 may be further configured to: if it is detected that the current hardware resource usage of the hardware layer of the second service board 702 exceeds a first threshold (or a fourth hardware resource alarm instruction issued by the intra-board Hypervisor 7022 in the second service board 702 is acquired), and if it is determined that the current hardware resource usage of the hardware layer of the control board 703 is lower than a second threshold, instruct the intra-board Hypervisor 7033 in the control board 703 to migrate resources to free a third hardware resource at the hardware layer of the control board 703, and to allocate the freed third hardware resource at the hardware layer of the control board 703 to a second VM or a first VM or a fifth VM running on the intra-board Hypervisor 7022 in the second service board 702, where the fourth hardware resource alarm instruction is issued by the second service board 702, for example, after the current hardware resource usage of the hardware layer of the second service board 702 exceeds the first threshold or another threshold.

Or, the inter-board Hypervisor 7032 may be further configured to: if it is detected that the current hardware resource usage of the hardware layer of the second service board 702 exceeds a first threshold, or a fourth hardware resource alarm instruction issued by the intra-board Hypervisor 7022 in the second service board 702 is acquired, and if it is determined that the hardware layer of the control board 703 currently has an idle third hardware resource, allocate the idle third hardware resource at the hardware layer of the control board 703 to a second VM or a first VM or a fifth VM running on the intra-board Hypervisor 7022 in the second service board 702, where the fourth hardware resource alarm instruction is issued by the second service board 702, for example, after the current hardware resource usage of the hardware layer of the second service board 702 exceeds the first threshold or another threshold.

Further, the intra-board Hypervisor 7033 may be configured to: if a third interrupt generated at the hardware layer of the control board 703 is received and it is determined that the hardware resource generating the third interrupt at the hardware layer of the control board 703 is the allocated third hardware resource, issue a fifth VM context corresponding to the third interrupt.

The intra-board Hypervisor 7022 in the second service board 702 is further configured to acquire the issued fifth VM context, or a sixth VM context that is obtained based on the fifth VM context and that corresponds to the third interrupt, and to transfer the acquired fifth VM context or sixth VM context to a second VM or a first VM or a fifth VM running on the intra-board Hypervisor 7022 in the second service board 702.

It can be understood that, the communication device 700 in this embodiment may be a communication device in the foregoing method embodiments, the working mechanism of running a virtualization system of the communication device 700 in this embodiment may be the same as a working mechanism described in the foregoing method embodiments, and functions of each function module may be specifically implemented according to the methods described in the foregoing method embodiments. For a specific function implementation process, reference may be made to relevant description in the foregoing method embodiments, and details are not provided herein again.

Referring to FIG. 8-*a*, a control board 800 further provided in an embodiment of the present disclosure, where the control board 800 is applied on a communication device, may include: a hardware layer 810 and an inter-board Hypervisor 820 running on the hardware layer 810.

The inter-board Hypervisor 820 includes an acquiring unit 821 and an issuing unit 822, where:

the acquiring unit 821 is configured to acquire a first VM context that is issued by a first service board deployed in a communication device and that corresponds to a first interrupt, where the first VM context corresponding to the first interrupt is issued by the first service board after the first service board determines that a first hardware resource generating the first interrupt at a hardware layer of the first service board is an allocated hardware resource in response to the first interrupt generated at the hardware layer of the first service board; and the issuing unit 822 is configured to issue the first VM context, or a second VM context that is obtained based on the first VM context and that corresponds to the first interrupt, so that a second service board deployed in the communication device, after acquiring the issued first VM context or second VM context, transfers the acquired first VM context or second VM context to a first VM running on the intra-board Hypervisor in the second service board, where the first VM is the employer of the first hardware resource.

In an embodiment of the present disclosure, the acquiring unit 821 may be specifically configured to acquire, from a shared memory, a first VM context that is issued by a first service board to the shared memory and that corresponds to a first interrupt, or to receive a first VM context that is issued by a first service board and that corresponds to a first interrupt; and the issuing unit 822 is specifically configured to issue the first VM context, or a second VM context that is obtained based on the first VM context and that corresponds to the first interrupt, to the shared memory, or to, after determining that the employer of the first hardware resource is the first VM, and further determining according to the determined employer of the first hardware resource that the second VM context corresponding to the first interrupt is to be issued to the second service board, issue the first VM context, or a second VM context that is obtained based on the first VM context and that corresponds to the first interrupt, to the second service board.

Referring to FIG. 8-*b*, in an embodiment of the present disclosure, the inter-board Hypervisor 820 may further include:

a first resource allocating unit 823, configured to: before the acquiring unit 821 acquires a first VM context that is issued by a first service board deployed in a communication device and that corresponds to a first interrupt, if it is detected that the current hardware resource usage of a hardware layer of a second service board exceeds a first threshold (or a first hardware resource alarm instruction issued by the second service board is acquired, where the first hardware resource alarm instruction is issued by the second service board after the current hardware resource usage of the hardware layer of the second service board exceeds the first threshold), and if it is determined that the current hardware resource usage of the hardware layer of the first service board is lower than a second threshold, instruct the first service board to migrate resources to free a first hardware resource at the hardware layer of the first service board, and allocate the freed first hardware resource at the hardware layer of the first service board to a first VM running on the intra-board Hypervisor in the second service board, where the first threshold is higher than, lower than, or equal to the second threshold;

or, a first resource allocating unit 823, configured to: before the acquiring unit 821 acquires a first VM context that is issued by a first service board deployed in a communication device and that corresponds to a first interrupt, if it is detected that the current hardware resource usage of a hardware layer of a second service board exceeds a first threshold (or a first hardware resource alarm instruction issued by the second service board is acquired, where the first hardware resource alarm instruction is issued by the second service board after the current hardware resource usage of the hardware layer of the second service board exceeds the first threshold), and if it is determined that the hardware layer of the first service board currently has an idle first hardware resource, allocate the idle first hardware resource at the hardware layer of the first service board to a first VM running on the intra-board Hypervisor in the second service board, where the first threshold is higher than, lower than, or equal to the second threshold.

In an embodiment of the present disclosure, if a communication device is further deployed with a third service board, a first resource allocating unit 823 may be further configured to: if it is detected that the current hardware resource usage of a hardware layer of a second service board exceeds a first threshold (or a third hardware resource alarm instruction issued by the second service board is acquired, where the third hardware resource alarm instruction is issued by the second service board after the current hardware resource usage of the hardware layer of the second service board exceeds the first threshold), and if it is determined that the current hardware resource usage of a hardware layer of the third service board is lower than a second threshold, instruct the third service board to migrate resources to free a second hardware resource at the hardware layer of the third service board, and allocate the freed second hardware resource at the hardware layer of the third service board to a second VM or a first VM running on the intra-board Hypervisor in the second service board;

or, a first resource allocating unit 823 may be further configured to: if it is detected that the current hardware resource usage of a hardware layer of a second service board exceeds a first threshold (or a third hardware resource alarm instruction issued by the second service board is acquired, where the third hardware resource alarm instruction is issued by the second service board after the current hardware resource usage of the hardware layer of the second service board exceeds the first threshold), and if it is determined that a hardware layer of the third service board currently has an idle second hardware resource, allocate the idle second hardware resource at the hardware layer of the third service board to a second VM or a first VM running on the intra-board Hypervisor in the second service board;

the acquiring unit 821 is further configured to acquire a third VM context that is issued by the third service board and that corresponds to a second interrupt, where the third VM context corresponding to the second interrupt is issued by the third service board after the third service board determines that the second hardware resource generating the second interrupt at the hardware layer of the third service board is an allocated hardware resource in response to the second interrupt generated at the hardware layer of the third service board; and the issuing unit 822 is further configured to issue the third VM context, or a fourth VM context that is obtained based on the third VM context and that corresponds to the second interrupt, so that a second service board, after acquiring the third VM context or fourth VM context, transfers the acquired third VM context or fourth VM context to a second VM or a first VM running on the intra-board Hypervisor in the second service board for processing.

Referring to FIG. 8-*c*, in an embodiment of the present disclosure, the inter-board Hypervisor 820 may further include:

a second resource allocating unit 824, configured to: after the issuing unit 822 issues a first VM context or a second VM context, if it is detected that the current hardware resource usage of a hardware layer of a first service board exceeds a first threshold or another threshold (or a second hardware resource alarm instruction issued by the first service board is acquired, where the second hardware resource alarm instruction is issued by the first service board after the current hardware resource usage of the hardware layer of the first service board exceeds the first threshold or another threshold), re-allocate the allocated first hardware resource at the hardware layer of the first service board to a VM running on the intra-board Hypervisor in the first service board.

It can be understood that, the control board 800 in this embodiment may be a control board in the foregoing method embodiments, the working mechanism of running a virtualization system of the control board 800 in this embodiment may be the same as a working mechanism described in the foregoing method embodiments, and functions of each function module may be specifically implemented according to the methods described in the foregoing method embodiments. For a specific function implementation process, reference may be made to relevant description in the foregoing method embodiments, and details are not provided herein again.

It should be noted that, for the methods according to the embodiments, for purposes of simplicity of explanation, the methods are described as a combination of a series of actions, but it should be clear to a person skilled in the art that the present disclosure is not limited by the order of the actions, as some steps can, in accordance with the present disclosure, be performed in other orders or concurrently. Next, a person skilled in the art should also know that, the embodiments described in the specification all fall within exemplary embodiments, and the related actions and modules are not necessarily required by the present disclosure.

An embodiment of the present disclosure further provides a computer storage medium, where the computer storage medium is capable of storing a program, which, when executed, includes all or a part of the steps of the virtualization management method for hardware resources of a communication device according to the above method embodiments.

In the embodiments, description for the embodiments has its own emphasis, and a part without being described in detail in a certain embodiment can be obtained with reference to relevant description in other embodiments.

Based on the above, in some embodiments of the present disclosure, a control board deployed in a communication device acquires a first virtual machine context that is issued by a first service board deployed in the communication device and that corresponds to a first interrupt, and issues the first virtual machine context corresponding to the first interrupt or a second virtual machine context corresponding to the first interrupt, so that a second service board deployed in the communication device, after acquiring the issued virtual machine context corresponding to the first interrupt, transfers the acquired virtual machine context corresponding to the first interrupt to a first virtual machine running on the intra-board Hypervisor in the second service board for processing, where the first virtual machine context corresponding to the first interrupt is issued by the first service board after the first service board determines that the first hardware resource generating the first interrupt at the hardware layer of the first service board is an allocated hardware resource in response to the first interrupt generated at the hardware layer of the first service board, in which the employer of the first hardware resource is the first virtual machine. On a communication device in an embodiment of the present disclosure, part of resources at a hardware layer of a service board may be allocated to a VM running on another service board. With a control board transferring the context of an interrupt, a service board completes the processing of the context of the interrupt. This method helps achieve cross-board sharing of hardware resources of service boards, further optimize the utilization of hardware resources of a communication device, and further boost the processing performance of a communication device.

In other embodiments of the present disclosure, a first service board deployed in a communication device receives a first interrupt generated at the hardware layer of the first service board, and, if it is determined that the hardware resource generating the first interrupt at the hardware layer of the first service board is an allocated first hardware resource, issues a first VM context corresponding to the first interrupt; a second service board deployed in the communication device acquires the issued first VM context, or a second VM context that is obtained based on the first VM context and that corresponds to the first interrupt, and transfers the acquired first VM context or second VM context to a first VM running on the intra-board Hypervisor in the second service board for processing, where the employer of the first hardware resource is the first VM. On a communication device in embodiments of the present disclosure, part of resources at the hardware layer of each service board may be allocated to a VM running on another service board. Each service board completes the processing of a VM context by transferring the VM context. This method helps achieve cross-board sharing of hardware resources of service boards, optimize the utilization of hardware resources of a communication device, and further boost the processing performance.

A person of ordinary skill in the art may understand that all or a part of the steps of the methods in the embodiments may be implemented by a program instructing relevant hardware (such as a processor, which is coupled with a memory). The program may be stored in a computer readable storage medium. The storage medium may include a non-transitory storage medium such as a read-only memory, a random access memory, a magnetic disk, and an optical disk.

A virtualization management method and related apparatuses for hardware resources of a communication device that are provided by the embodiments of the present disclosure are described in detail above. The principle and implementation manners of the present disclosure are described herein through specific examples. The description about the embodiments of the present disclosure is provided merely for ease of understanding of the method and core ideas of the present disclosure. A person of ordinary skill in the art can make variations and modifications to the present disclosure in terms of specific implementation manners and application scopes according to the ideas of the present disclosure. Therefore, the specification shall not be construed as a limitation to the present disclosure.

What is claimed is:

1. A virtualization management method for managing hardware resources of a communication device comprising an inter-board Hypervisor running on a hardware layer of a control board, comprising:
    allocating, by the inter-board Hypervisor, a first hardware resource which is freed at a hardware layer of a first service board deployed in a communication device, to a first virtual machine running on an intra-board Hypervisor in a second service board deployed in the communication device when one of the following situations occurs:
        the first service board is instructed to migrate resources to free the first hardware resource at the hardware layer of the first service board when it is detected that the current hardware resource usage of a hardware layer of the second service board exceeds a first threshold;
        the first service board is instructed to migrate resources to free the first hardware resource at the hardware layer of the first service board when a first hardware resource alarm instruction issued by the second service board is acquired and it is determined that the current hardware resource usage of the hardware layer of the first service board is lower than a second threshold, wherein the first hardware resource alarm instruction is issued by the second service board after the current hardware resource usage of the hardware layer of the second service board exceeds a first threshold, which is higher than, lower than, or equal to the second threshold; and
        a first hardware resource alarm instruction issued by the second service board is acquired and it is determined that the hardware layer of the first service board currently has the first hardware resource which is freed, wherein the first hardware resource alarm instruction is issued by the second service board after the current hardware resource usage of the hardware layer of the second service board exceeds a first threshold;
    acquiring, by the inter-board Hypervisor, a first virtual machine context that is issued by the first service board and that corresponds to a first interrupt, or a second virtual machine context that is obtained based on the first virtual machine context and a determined employer, wherein the first virtual machine context is issued by the first service board after the first service board determines that the first hardware resource generating the first interrupt at the hardware layer of the first service board is an allocated hardware resource in response to the first interrupt generated at the hardware layer of the first service board; and
    issuing, by the inter-board Hypervisor, the first virtual machine context, or the second virtual machine context, so that the second service board transfers the first virtual machine context or the second virtual machine context to the first virtual machine for processing on the intra-board Hypervisor in the second service board deployed in the communication device.

2. The method according to claim 1, before the issuing the second virtual machine context that is obtained based on the first virtual machine context, further comprising:
    if the first virtual machine context does not include an employer identifier of the first hardware resource, adding the employer identifier of the first hardware resource to the first virtual machine context to obtain the second virtual machine context.

3. The method according to claim 1, wherein:
    the step of acquiring a first virtual machine context is implemented through one of a) and b):
    a) acquiring, from a shared memory, the first virtual machine context that is issued by the first service board to the shared memory; and
    b) receiving the first virtual machine context that is issued by the first service board;
    and
    the step of issuing the first virtual machine context or the second virtual machine context is implemented through one of i) and j):
    i) issuing the first virtual machine context, or the second virtual machine context to a shared memory; and
    j) after determining that the employer of the first hardware resource is the first virtual machine, and further determining according to the first virtual machine that the first virtual machine context or the second virtual machine context is to be issued to the second service board, issuing the first virtual machine context or the second virtual machine context to the second service board.

4. The method according to claim 1, wherein the method further comprises:
    re-allocating the first hardware resource to a virtual machine running on the intra-board Hypervisor in the first service board, when one of the following situations occurs:

the current hardware resource usage of the hardware layer of the first service board exceeds the first threshold; and a second hardware resource alarm instruction issued by the first service board is acquired, wherein the second hardware resource alarm instruction is issued by the first service board after the current hardware resource usage of the hardware layer of the first service board exceeds the first threshold.

5. The method according to claim 1, wherein the communication device is further deployed with a third service board, the method further comprising:

instructing the third service board to migrate resources to free a second hardware resource at a hardware layer of the third service board, and allocating the second hardware resource to a second virtual machine or the first virtual machine running on the intra-board Hypervisor in the second service board, when one of the following situations occurs:

the current hardware resource usage of the hardware layer of the second service board exceeds the first threshold; and a third hardware resource alarm instruction issued by the second service board is acquired, and it is determined that the current hardware resource usage of the hardware layer of the third service board is lower than the second threshold, wherein the third hardware resource alarm instruction is issued by the second service board after the current hardware resource usage of the hardware layer of the second service board exceeds the first threshold; and issuing a third virtual machine context, or a fourth virtual machine context that is obtained based on the third virtual machine context and that corresponds to the second interrupt, so that the second service board, after acquiring the third virtual machine context or the fourth virtual machine context, transfers the third virtual machine context or fourth virtual machine context to a first virtual machine or the second virtual machine running on the intra-board Hypervisor in the second service board for processing, when the third virtual machine context is acquired, wherein the third virtual machine context is issued by the third service board after the third service board determines that the second hardware resource generating the second interrupt at the hardware layer of the third service board is an allocated hardware resource in response to the second interrupt.

6. A control board, wherein the control board is used in a communication device and comprises a hardware layer and an inter-board Hypervisor running on the hardware layer, wherein:

the inter-board Hypervisor comprises an acquiring unit and an issuing unit wherein, the acquiring unit is configured to acquire a first virtual machine context that is issued by a first service board deployed in the communication device and that corresponds to a first interrupt, or a second virtual machine context that is obtained based on the first virtual machine context and a determined employer, wherein the first virtual machine context is issued by the first service board after the first service board determines that a first hardware resource generating the first interrupt at a hardware layer of the first service board is an allocated hardware resource in response to the first interrupt generated at the hardware layer of the first service board; and the issuing unit is configured to issue the first virtual machine context, or the second virtual machine context, so that a second service board deployed in the communication device, transfers the acquired first virtual machine context or the second virtual machine context to a first virtual machine for processing on a intra-board Hypervisor in the second service board, wherein the first virtual machine is an employer of the first hardware resource;

wherein the inter-board Hypervisor further comprises a first resource allocating unit;

wherein, the first resource allocating unit is configured to allocate a first hardware resource which is freed at a hardware layer of a first service board deployed in a communication device, to a first virtual machine running on the intra-board Hypervisor in a second service board deployed in the communication device when one of the following situations occurs:

the first service board is instructed to migrate resources to free the first hardware resource at the hardware layer of the first service board when it is detected that the current hardware resource usage of a hardware layer of the second service board exceeds a first threshold;

the first service board is instructed to migrate resources to free the first hardware resource at the hardware layer of the first service board when a first hardware resource alarm instruction issued by the second service board is acquired and it is determined that the current hardware resource usage of the hardware layer of the first service board is lower than a second threshold, wherein the first hardware resource alarm instruction is issued by the second service board after the current hardware resource usage of the hardware layer of the second service board exceeds a first threshold, which is higher than, lower than, or equal to the second threshold; and a first hardware resource alarm instruction issued by the second service board is acquired and it is determined that the hardware layer of the first service board currently has the first hardware resource which is freed, wherein the first hardware resource alarm instruction is issued by the second service board after the current hardware resource usage of the hardware layer of the second service board exceeds a first threshold.

7. The control board according to claim 6, wherein:

the acquiring unit is configured to acquire, from a shared memory, a first virtual machine context that is issued by the first service board to the shared memory and that corresponds to a first interrupt, or, to receive a first virtual machine context that is issued by the first service board and that corresponds to a first interrupt; and the issuing unit is configured to issue the first virtual machine context, or the second virtual machine context that is obtained based on the first virtual machine context, to a shared memory, or, after determining that the employer of the first hardware resource is the first virtual machine, and further determining according to the determined employer of the first hardware resource that the second virtual machine context is to be issued to the second service board, to issue the first virtual machine context, or the second virtual machine context, to the second service board.

8. The control board according to claim 6, wherein:

the inter-board Hypervisor further comprises:

a second resource allocating unit, configured to: after the issuing unit issues the first virtual machine context or the second virtual machine context, re-allocate the allocated first hardware resource at the hardware layer of the first service board to a virtual machine running on the intra-board Hypervisor in the first service board, when one of the following situations occurs:

the current hardware resource usage of the hardware layer of the first service board exceeds the first threshold; and a second hardware resource alarm instruction issued by the first service board is acquired, wherein the second hardware resource alarm instruction is issued by the first service board after the current hardware resource usage of the hardware layer of the first service board exceeds the first threshold.

9. The control board claim 6, wherein the communication device is further deployed with a third service board, wherein:

the first resource allocating unit is further configured to: instruct the third service board to migrate resources to free a second hardware resource at a hardware layer of the third service board, and allocate the freed second hardware resource at the hardware layer of the third service board to a second virtual machine or the first virtual machine running on the intra-board Hypervisor in the second service board, if it is detected that the current hardware resource usage of the hardware layer of the second service board exceeds the first threshold, or a third hardware resource alarm instruction issued by the second service board is acquired, and if it is determined that the current hardware resource usage of the hardware layer of the third service board is lower than the second threshold, wherein the third hardware resource alarm instruction is issued by the second service board after the current hardware resource usage of the hardware layer of the second service board exceeds the first threshold;

wherein, the acquiring unit is further configured to acquire a third virtual machine context that is issued by the third service board and that corresponds to a second interrupt, wherein the third virtual machine context is issued by the third service board after the third service board determines that the second hardware resource generating the second interrupt at the hardware layer of the third service board is an allocated hardware resource in response to the second interrupt generated at the hardware layer of the third service board; and the issuing unit is further configured to issue the third virtual machine context, or a fourth virtual machine context that is obtained based on the third virtual machine context and that corresponds to the second interrupt, so that the second service board, after acquiring the third virtual machine context or the fourth virtual machine context, transfers the acquired third virtual machine context or fourth virtual machine context to the second virtual machine or the first virtual machine running on the intra-board Hypervisor in the second service board for processing.

10. A communication device, wherein the communication device comprises a first service board, a second service board, and a control board, wherein each of the first service board and the second service board comprises a hardware layer, an intra-board Hypervisor running on the hardware layer, and at least one virtual machine running on the intra-board Hypervisor, and the control board comprises a hardware layer and an inter-board Hypervisor running on the hardware layer, wherein:

the intra-board Hypervisor in the first service board is configured to issue a first virtual machine context corresponding to a first interrupt after determining that a first hardware resource generating the first interrupt at the hardware layer of the first service board is an allocated hardware resource in response to the first interrupt generated at the hardware layer of the first service board;

the inter-board Hypervisor in the control board is configured to acquire the first virtual machine context and issue the first virtual machine context, or a second virtual machine context that is obtained based on the first virtual machine context and a determined employer; and the intra-board Hypervisor in the second service board is configured to: acquire the issued first virtual machine context or the second virtual machine context, transfer the acquired first virtual machine context or the second virtual machine context to a first virtual machine on the intra-board Hypervisor in the second service board for processing, wherein the first virtual machine is an employer of the first hardware resource;

wherein the inter-board Hypervisor in the control board is further configured to:

allocating a first hardware resource which is freed at a hardware layer of a first service board deployed in a communication device, to a first virtual machine running on the intra-board Hypervisor in a second service board deployed in the communication device when one of the following situations occurs:

the first service board is instructed to migrate resources to free the first hardware resource at the hardware layer of the first service board when it is detected that the current hardware resource usage of a hardware layer of the second service board exceeds a first threshold;

the first service board is instructed to migrate resources to free the first hardware resource at the hardware layer of the first service board when a first hardware resource alarm instruction issued by the second service board is acquired and it is determined that the current hardware resource usage of the hardware layer of the first service board is lower than a second threshold, wherein the first hardware resource alarm instruction is issued by the second service board after the current hardware resource usage of the hardware layer of the second service board exceeds a first threshold, which is higher than, lower than, or equal to the second threshold; and a first hardware resource alarm instruction issued by the second service board is acquired and it is determined that the hardware layer of the first service board currently has the first hardware resource which is freed, wherein the first hardware resource alarm instruction is issued by the second service board after the current hardware resource usage of the hardware layer of the second service board exceeds a first threshold.

11. The communication device according to claim 10, wherein:

the inter-board Hypervisor in the control board is configured to acquire, from a shared memory, a first virtual machine context that is issued by the first service board to the shared memory and that corresponds to a first interrupt, or to receive a first virtual machine context that is issued by the first service board and that corresponds to a first interrupt; and to issue the first virtual machine context, or the second virtual machine context that is obtained based on the first virtual machine context, to a shared memory.

12. The communication device according to claim 10, wherein:

the inter-board Hypervisor in the control board is further configured to: after issuing the first virtual machine context, or the second virtual machine context that is obtained based on the first virtual machine context, reallocate the allocated first hardware resource at the hardware layer of the first service board to a virtual machine running on the intra-board Hypervisor in the first service board, when one of the following situations occurs:

it is detected that the current hardware resource usage of the hardware layer of the first service board exceeds the first threshold; and a second hardware resource alarm instruction issued by the first service board is acquired, wherein the second hardware resource alarm instruction is issued by the first service board after the current hardware resource usage of the hardware layer of the first service board exceeds the first threshold.

13. The communication device according to claim 10, wherein the communication device is further deployed with a third service board, wherein the third service board comprises a hardware layer, an intra-board Hypervisor running on the hardware layer, and at least one virtual machine running on the intra-board Hypervisor, wherein:

the inter-board Hypervisor in the control board is further configured to: instruct the third service board to migrate resources to free a second hardware resource at a hardware layer of the third service board, and allocate the freed second hardware resource at the hardware layer of the third service board to a second virtual machine or the first virtual machine running on the intra-board Hypervisor in the second service board, if it is detected that the current hardware resource usage of the hardware layer of the second service board exceeds the first threshold, or a third hardware resource alarm instruction issued by the second service board is acquired, and if it is determined that the current hardware resource usage of the hardware layer of the third service board is lower than the second threshold, wherein the third hardware resource alarm instruction is issued by the second service board after the current hardware resource usage of the hardware layer of the second service board exceeds the first threshold; and acquire a third virtual machine context that is issued by the third service board and that corresponds to a second interrupt, wherein the third virtual machine context is issued by the third service board after the third service board determines that the second hardware resource generating the second interrupt at the hardware layer of the third service board is an allocated hardware resource in response to the second interrupt generated at the hardware layer of the third service board, issue the third virtual machine context, or a fourth virtual machine context that is obtained based on the third virtual machine context and that corresponds to the second interrupt, so that the second service board, after acquiring the third virtual machine context or the fourth virtual machine context, transfers the acquired third virtual machine context or fourth virtual machine context to the second virtual machine or the first virtual machine running on the intra-board Hypervisor in the second service board for processing.

* * * * *

UNITED STATES PATENT AND TRADEMARK OFFICE
CERTIFICATE OF CORRECTION

PATENT NO. : 9,558,025 B2  
APPLICATION NO. : 14/081823  
DATED : January 31, 2017  
INVENTOR(S) : Wang et al.

Page 1 of 1

It is certified that error appears in the above-identified patent and that said Letters Patent is hereby corrected as shown below:

On the Title Page

Item (73), "Huwaei Technologies Co., Ltd., Shenzhen (CN)" should read -- Huawei Technologies Co., Ltd., Shenzhen (CN) --.

Signed and Sealed this  
Ninth Day of May, 2017

Michelle K. Lee  
*Director of the United States Patent and Trademark Office*